US011120017B1

(12) United States Patent
Lee et al.

(10) Patent No.: US 11,120,017 B1
(45) Date of Patent: Sep. 14, 2021

(54) RENDERING INTERACTIVE SUBSIDIARY APPLICATION(S) IN RESPONSE TO A SEARCH REQUEST

(71) Applicant: Google LLC, Mountain View, CA (US)

(72) Inventors: Mike K. Lee, Santa Clara, CA (US); Weizhao Wang, Sunnyvale, CA (US); Swaminathan Subramanian, Santa Clara, CA (US); Yunbing Tan, Palo Alto, CA (US); Allen Harvey, New York, NY (US)

(73) Assignee: Google LLC, Mountain View, CA (US)

( * ) Notice: Subject to any disclaimer, the term of this patent is extended or adjusted under 35 U.S.C. 154(b) by 8 days.

(21) Appl. No.: 16/809,012

(22) Filed: Mar. 4, 2020

(51) Int. Cl.
*G06F 16/242* (2019.01)
*G06F 3/0488* (2013.01)
*G06Q 50/12* (2012.01)
*G06F 3/0482* (2013.01)
*G06F 16/25* (2019.01)

(52) U.S. Cl.
CPC ........ *G06F 16/2428* (2019.01); *G06F 3/0482* (2013.01); *G06F 3/0488* (2013.01); *G06F 16/243* (2019.01); *G06F 16/252* (2019.01); *G06Q 50/12* (2013.01)

(58) Field of Classification Search
CPC ...... G06F 16/24; G06F 16/243; G06F 16/252; G06F 3/0482; G06F 3/0488; G06Q 50/12
USPC .......................................................... 709/769
See application file for complete search history.

(56) References Cited

U.S. PATENT DOCUMENTS

| 8,949,250 | B1 * | 2/2015 | Garg | G06Q 50/01 707/748 |
| 9,646,097 | B2 | 5/2017 | Kumar et al. | |
| 10,289,729 | B2 * | 5/2019 | Wang | G06F 16/338 |
| 10,360,227 | B2 * | 7/2019 | Garg | H04L 67/42 |
| 2009/0248478 | A1 * | 10/2009 | Duggal | G06Q 30/0243 705/14.42 |
| 2012/0166276 | A1 | 6/2012 | Chitnis et al. | |
| 2017/0116161 | A1 * | 4/2017 | Stein | G06F 3/04842 |
| 2017/0116339 | A1 * | 4/2017 | Stein | G06F 16/9535 |
| 2019/0377588 | A1 * | 12/2019 | Gupta | G06F 16/24 |
| 2020/0117339 | A1 * | 4/2020 | Amitay | H04L 51/32 |

OTHER PUBLICATIONS

Google Developers; Create App-like Experiences on Google Search and the Google Assistant (Google I/O'19) https://www.youtube.com/watch?v=0Hyt7gjHYO4, May 8, 2019.

* cited by examiner

*Primary Examiner* — William D Titcomb
(74) *Attorney, Agent, or Firm* — Middleton Reutlinger

(57) ABSTRACT

Implementations set forth herein relate to providing a subsidiary application GUI via a client interface. The GUI can be rendered when a user is accessing a first party system via an application that is provided by the first party or a separate entity. The subsidiary application GUI can be rendered in response to the user providing a search query to the first party server—such as a search query that is in furtherance of initializing receiving certain search results. The server can identify, based on the search query, one or more entities that offer primary and/or subsidiary applications, and request subsidiary data for visibly rendering corresponding subsidiary applications for each entity. The subsidiary applications can optionally provide access to application functions that would not otherwise be available at the client without a corresponding application being installed.

20 Claims, 13 Drawing Sheets

RENDERING INTERACTIVE SUBSIDIARY APPLICATION(S) IN RESPONSE TO A SEARCH REQUEST

BACKGROUND

Various computer applications can provide users with access to a variety of different functions such as obtaining information, controlling devices, performing tasks, and/or other computer-related operations. For example, a restaurants application can provide a user the ability to view reviews and/or menus for various restaurants, make reservations at the restaurants, and/or order delivery or take-out from the restaurants. However, to utilize a standard computer application, the computer application should be installed at a corresponding client device, thereby requiring download of the application (requiring usage of network resources), and storage of the application locally at the client device (requiring usage of limited storage resources at the client device). Moreover, when a user desires to access certain function(s) of the application, the application must first be launched, then the user must navigate, via user input(s), through one or more states of the application in order to access the certain function(s). For example, to order take-out from a restaurant via the restaurants application, the user may need to provide user inputs in the application to navigate to a state of the application that includes information for the restaurant, along with interface element(s) for ordering take-out and separate interface element(s) for making a reservation.

Deeplinks have been proposed for launching applications in particular states. However, deeplinks may still require installation of the application and execution of the application. Moreover, the state to which an application launches may still include interface elements and/or other content that are irrelevant to the function(s) sought by the user. For example, the state of the restaurants application mentioned above can include, along with interface element(s) for ordering take-out, information for the restaurant and interface element(s) for making a reservation—despite the user seeking only to order take-out. Accordingly, network and/or computer resources are wasted in retrieving and rendering such irrelevant content.

Various webpages can also provide users with access to a variety of different functions. For example, a restaurants webpage can provide a user the ability to view reviews and/or menus for various restaurants, make reservations at the restaurants, and/or order delivery or take-out from the restaurants. However, when a user desires to access certain function(s) of the webpage, the user may be required to navigate to the webpage through one or more inputs. Moreover, as with certain states of applications, the webpage may still include interface element(s) and/or other content that are irrelevant to the function(s) sought by the user. Accordingly, network and/or computer resources are wasted in retrieving and rendering such irrelevant content.

SUMMARY

Implementations set forth herein relate to rendering interactive subsidiary application(s) in response to a search request. In some of those implementations a first party, that receives and processes the search request, can determine subsidiary application(s) that are responsive to the search request. The first party can further cause interactive graphical user interface(s) (GUI(s)) for the responsive subsidiary application(s) to be rendered responsive to the search request, optionally along with other non-subsidiary content search result(s) that are also responsive to the search request (e.g., search results that link to webpages, videos, images, or other content). For example the responsive subsidiary application(s) can be rendered, along with other non-subsidiary content search result(s), on a search results page that is provided responsive to the search request. For instance, the responsive subsidiary application(s) can be rendered more prominently than (e.g., positioned above) the other non-subsidiary content search result(s).

The subsidiary application(s) are each at least partially controlled by a corresponding party, such as a corresponding third party that is disparate from the first party that receives and processes the search request. User interaction(s) with a rendered interactive GUI of a responsive subsidiary application can be transmitted, optionally via server(s) of the first party, to server(s) of the party that controls the subsidiary application. For example, data characterizing user interactions can be transmitted to the server(s) via an application programming interface (API). The server(s) of the party that controls the subsidiary application can, in dependence on the interaction(s), cause the interactive GUI for the subsidiary application to be updated to reflect the interaction(s). For example, the server(s) can transmit update data, optionally to sever(s) of the first party, to cause the interactive GUI to be updated in accordance with the update data.

In some implementations, a subsidiary application can be considered subsidiary in that the subsidiary application provides functionality that is available via a website and/or application of a corresponding party, but provides a subset (e.g., less functions than a complete set of functions) of the functionalities and/or content available via the website and/or the application. In some of those implementations, the subsidiary application can provide a subset of the functionalities and/or content that are available via a given webpage of the corresponding party and/or via a given state of the application. For example, a given state of an application can include a first interactive element for making a reservation and a second interactive element for ordering take-out, but a first subsidiary application can include only the first interactive element (or a counterpart thereof) and a second subsidiary application can include only the second interactive element (or a counterpart thereof). For instance, the first subsidiary application can be responsive to search query/queries that includes the term "take-out" (and/or synonyms thereof), but that lack the term "reservation" (and/or synonyms thereof). On the other hand, the second subsidiary application can be responsive to search query/queries that include the term "reservation" (and/or synonyms thereof), but that lack the term "take-out" (and/or synonyms thereof).

Additionally or alternatively, a given state of an application can include a superset of non-interactive content (e.g., explanatory information, deeplink(s) to other state(s) of the application, etc.), but the first subsidiary application can include only a subset (or none) of the superset of non-interactive content. As described herein, by including only a subset of the functionalities and/or content, the subsidiary applications can be rendered with less data, can be rendered with reduced latency, and can occupy less screen "real estate" when rendered. Moreover, by including only interface element(s) for the subset of functionalities that are relevant to a query, a user can more quickly locate and interact with such interface elements, enabling a task of the user to be concluded more quickly. Such quicker conclusions can shorten the duration with which the user interacts with a client device in performing the task, thereby conserving power and/or other client device resource(s).

In various implementations a subsidiary application can be determined to be responsive to a search query based on being linked with the search query. For example, the subsidiary application can be linked with the search query as a whole (e.g., a canonical form thereof), one or more term(s) of the search query, and/or intent(s) and/or entity/entities of the search query. In some of those implementations, the party that controls the subsidiary application can submit a request for linking of the subsidiary application with the search query (e.g., as a whole, term(s) thereof, and/or intent(s) or entity/entities thereof). Prior to linking the subsidiary application with the search query in response to a request, one or more automated verifications can optionally be performed to ensure that the subsidiary application is truly responsive to the search query.

As one example, the linking of a subsidiary application, of a party, with a search query, can be contingent on verifying that the party has a webpage and/or an application that is currently responsive to the search query, and optionally that the webpage and/or the application have a score, for the search query, that satisfies a threshold. For instance, the score for a webpage or application for a search query can be based at least in part on a selection rate, for the webpage or application, and for the search query. As another example, content of the subsidiary application can be additionally or alternatively be compared to content of webpage(s) for the party that are responsive to the search query and/or to application state(s), of an application of the party, that are responsive to the search query, to ensure there is at least a threshold degree of matching. For instance, linking of the subsidiary application to the search query can be contingent on determining that content of the subsidiary application has at least a threshold degree of matching with a webpage, based on the webpage being published by the party and based on the webpage being responsive to the search query (and optionally based on it having a threshold score for the search query). Soft matching and/or exact matching can be utilized. Implementations that verify subsidiary applications prior to linking them with corresponding search queries can mitigate occurrences of computationally wasteful rendering of subsidiary applications that are not considered relevant to the corresponding search queries.

In various implementations, after linking a subsidiary application with a search query, measure(s) of interaction (e.g., interaction rate) with the subsidiary application, in response to its rendering responsive to the search query, can be determined. The interaction measure(s) can be utilized in adjusting how prominently the subsidiary application is rendered responsive to the search query and/or whether it is rendered responsive to the search query. For instance, a subsidiary application can be removed from being considered "responsive" to a search query if an interaction rate, with the subsidiary application when rendered responsive to the search query, fails to satisfy a threshold interaction rate.

In some implementations, when a subsidiary application is rendered responsive to a search request of a client device, one or more rendered interactive elements of the subsidiary application can be rendered in a state that is based on contextual parameter(s) that specify one or more aspects of a context in which the search query was provided. The first party that receives the search query can determine the contextual parameter(s). In some implementations, the first party can pass the context to a party that controls a subsidiary application to be rendered, to enable that party to preemptively adapt interactive element(s) to a state that is based on the contextual parameter(s). In some additional or alternative implementations, the first party can interact (e.g., via simulated inputs) with a subsidiary application to itself preemptively adapt the interactive element(s) to the state that is based on the contextual parameter(s). The contextual parameter(s) can include, for example, contextual parameter(s) that are: based on one or more previous search queries issued by the client device prior to the search request, based on content being rendered at the client device at the time of the search request (and/or recently relative to the search request), based on content from other non-search interaction(s) with the first party (e.g., prior browsing history; and/or content determined from an email, of a user account of the client device, received at an email system of the first party), based on a current location, based on a current time of day, based on a current day of the week, and/or based on other content linked to the client device and/or to a user account of the client device. Preemptively adapting interactive element(s) based on contextual parameter(s) can obviate user interaction with the interactive element(s) in various situations, thereby enabling a task of the user to be concluded more quickly. The quicker conclusion can shorten the duration with which the user interacts with a client device in performing the task, thereby conserving power and/or other client device resource(s).

As one example, contextual parameter(s) can be based on one or more search queries issued by the client device most recently relative to the current search query and/or issued within a threshold amount of time relative to the current query. For instance, assume a first search query of "vegan cuisine", immediately followed by a second search query of "order take-out." Further assume that a given subsidiary application is linked to the second search query, that the given subsidiary application can be interacted with to locate a take-out restaurant and then order take-out therefrom; and also assume that the given subsidiary application includes an initial state that includes a "cuisine type" interactive element that can be interacted with to enable a user to select cuisine type(s) when locating a take-out restaurant that offers selected cuisine type(s). In such an example, the first party system can interact with the subsidiary application to preemptively select a "cuisine type" of "vegan" based on the preceding first search query of "vegan cuisine." Accordingly, the subsidiary application can be initially rendered with the "cuisine type" interactive element in a state where "vegan" is preselected, thereby reducing a quantity of user inputs required in interacting with the subsidiary application to accomplish the task of ordering take-out.

Accordingly, various implementations disclosed herein render interactive subsidiary applications directly within a search results interface, such as a search results interface rendered by a browser application, an automated assistant application, and/or any other application. As described herein, a subsidiary application can be controlled by a party and can provide a subset of the functionality of a website and/or application of that party. The party that controls the subsidiary application can be a third party (i.e., an entity that is different from a first party that receives and/or processes the query). Moreover, the subsidiary application can be rendered responsive to a search query. Accordingly, though interaction with the subsidiary application, a user can leverage functionality of a separate application and/or webpage, without having to open the webpage or the separate application. Moreover, the interactive interface element(s) of the subsidiary application can correspond directly to the search query, thereby enabling a user to quickly interact with those interactive elements without being distracted by other interface element(s) and/or other content that does not directly correspond to the search query. Put another way, the interactive interface element(s) of the subsidiary application can optionally be limited to interactive elements that have been designated, by a party that controls the subsidiary application, as relevant to the search query.

As one particular example, assume a first party system receives a request via a client device interface, such as a search field, touch display, microphone, and/or any other interface. The request can be, for example, for the first party application to search for information about certain types of package tracking applications, and/or any other type of application. For instance, the first party system can be a search system and the input can be a textual input such as "Track package number ABDE1234XYZ." In response to the input, the search system can generate query data that characterizes the request from the user (including the package tracking information), and provide the query data to one or more different third party entities. For instance, the search system can provide the query data to the one or more different third party entities based on those one or more different third party entities having corresponding subsidiary applications that have been linked to the request (e.g., as described herein). The query data can include content of the query and/or an indication of the corresponding subsidiary application that is instantiated by the request. For example, the query data can include content of the query by including one or more terms of the query. Also, for example, the query data sent to a given third party entity can additionally or alternatively include an indication of the corresponding subsidiary application of the third party entity, such as an identifier of the subsidiary third party entity based on that identifier being stored in association with the third party entity and the query. Optionally, different query data can be sent to different third party entities for a given query (e.g., each instance of query data can identify a different subsidiary third party entity identifier, each being for a different third party).

Each of the third party entities can provide access to a corresponding subsidiary third party application that is accessible via a first party system, and linked with the request. Therefore, each subsidiary third party application rendered to a user can be unique for each unique request provided to the first party application. In some implementations, each third party entity can respond to the received query data with entity-specific GUI data. The entity-specific GUI data can be processed by the first party system and rendered at an interface of a client device that provides access to the first party system. The entity-specific GUI data can characterize interactive content for each subsidiary third party application, respectively, in order that the user can begin interacting with a particular subsidiary third party application. As a result, various services (e.g., controlling a home security system or communicating with other package handling service providers) offered by a corresponding third party entity can be employed without having to excessively consume memory and network bandwidth (e.g., by accessing, downloading, and/or installing a corresponding third party application on a respective device).

In some implementations, entity-specific GUI data received from the multiple different third party entities can be ranked and/or prioritized according to one or more properties selected by the first party system. For instance, the first party system can prioritize entity-specific GUI data that is more relevant to the request over other entity-specific GUI data that is less relevant to the request from the user. Furthermore, subsidiary third party applications corresponding to the highest prioritized entity-specific GUI data can be rendered in a first portion of the interface through which the user is accessing the first party system. The interface of the first party system can be void of other subsidiary third party applications corresponding to entity-specific GUI data that was not prioritized over a majority of other entity-specific GUI data. A second portion of the interface of the first party application can provide results from other sources, such as websites and/or any other server and/or application capable of communicating with the client device. For instance, in response to the aforementioned request from the user, the first portion of the interface can provide a "carousel" GUI for scrolling through the subsidiary third party applications that have been rendered, and a second portion of the interface can provide a list of web results related to the textual input from the user (e.g., web results related to tracking packages).

In some implementations, an arrangement of the application interface through which a user is accessing the first party system can allow the user to interact with multiple different subsidiary third party applications simultaneously. For example, the first party system can receive entity-specific GUI data from various third party entities and simultaneously cause subsidiary third party applications to be rendered at the interface. When, for instance, a search query is, "track my package," the rendered subsidiary third party applications can include a subsidiary third party application from a third party entity that is handling a package for the user. The rendered subsidiary third party applications can also include another subsidiary third party application from another third party entity that is handling another package for the user. If the user submits tracking info to a third party entity that is not associated with the provided tracking info, updated query data can nonetheless be submitted to the various third party entities. In response, the third party entity that is handling the corresponding package can receive the tracking information and cause the computing device to render updated interactive content at an interface of the subsidiary third party application corresponding to that third party entity.

In some implementations, authentication of the user and/or a trusted device of the user can be a basis for authentication data to be included in query data. Furthermore, a selection of third party entities for receiving the query data can also be based on the authentication of the user and/or the trusted device being used by the user. As an example, when the user has been authenticated with the first party system, the first party system can generate secured data that can be transmitted to third party entities that the user has authorized and/or that are otherwise associated with the user. In response to receiving the query data from the first party system, each third party entity can generate entity-specific GUI data that also authenticates the user and/or the trusted device, in order for the trusted device to securely receive the entity-specific GUI data. Subsidiary third party applications that are rendered at the interface of via the first party system can, as a result, include entity-specific features and user specific features. For example, each of the subsidiary third party applications that corresponds to package tracking applications can be rendered with indications of current operating statuses of package handling devices near a home of the user, at least based on having received prior permission from the user to render such statuses.

When a user is interacting with interactive content of a subsidiary third party application, the first party system can generate modified query data that is based on interactions between the user and the subsidiary third party application. As an example, when the user is presented with the subsidiary third party application at the interface of the first party system, the subsidiary third party application can include interactive GUI elements such as drop-down menus, text fields, and/or any other interactive GUI element. When the user selects an item in a drop-down menu, the first party system can generate modified search query data that characterizes the item selected from the drop-down menu. The modified query data can then be shared with the corresponding third party entity in furtherance of initializing an action that is made available by the third party entity, such as making a reservation for a service (e.g., scheduling to pick up a package).

In some implementations, the modified search query data can further characterize updated authentication data that, when provided to the third party entity, provides an indication that the same authenticated user is still interacting with the subsidiary third party application. In response, the third party entity can provide supplemental entity-specific GUI data, which can replace and/or supplement any portion of entity-specific GUI data received by the first party system from the third party entity. As an example, the previously received entity-specific GUI data can characterize the "drop-down menu" that the user interacted with, and the supplemental entity-specific GUI data can characterize a different drop-down menu for specifying further parameters for the action made available by the third party entity.

The above description is provided as an overview of some implementations of the present disclosure. Further description of those implementations, and other implementations, are described in more detail below.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
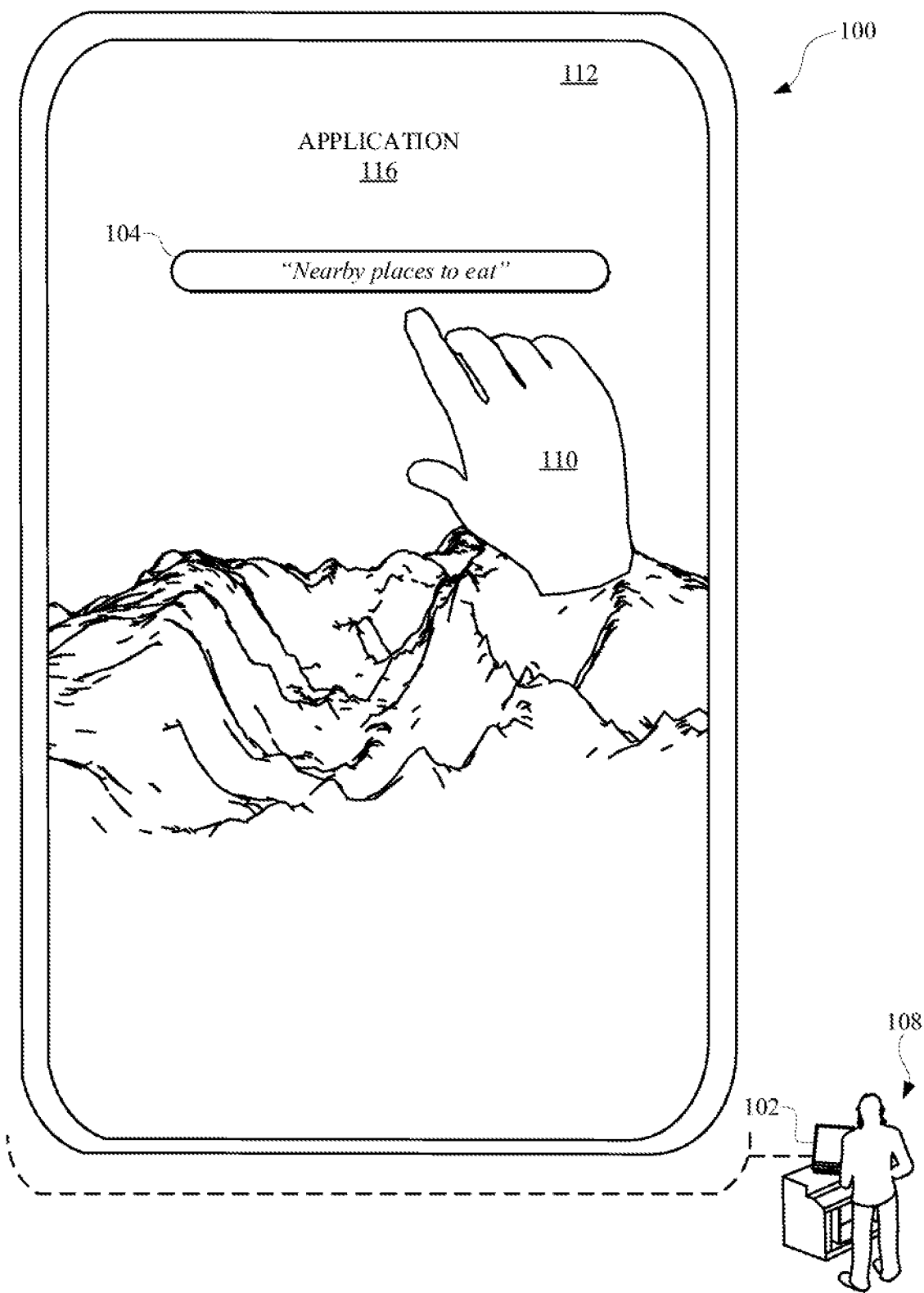
FIG. 1A, FIG. 1B, FIG. 1C, FIG. 1D, and FIG. 1E illustrate views of a user providing a query to a first party system and causing the computing device to render multiple different subsidiary third party applications in response.

FIG. 1A, FIG. 1B, FIG. 1C, FIG. 1D, and FIG. 1E illustrate a view 100, a view 120, a view 140, a view 160, and a view 180 of a user 108 providing a query to an application 116 via a computing device 102 and causing a first party system to render multiple different subsidiary third party applications based on the query. Specifically, the user 108 can provide a query to the computing device 102 by typing natural language content into a text field 104 being rendered at a touch interface 112 of the computing device 102. The user 108 can use their hand 110 in order to tap on the text field 104 and type in natural language content that embodies a search query input to the application 116, which can be a browser, automated assistant, and/or any other application capable of receiving user input. In response to receiving the search input (e.g., "Nearby places to eat"), the first party system can generate query data, which can be formatted for providing to multiple different third party entities that individually provide entity data that can be used by the application 116 in order to render one or more subsidiary third party applications.

In some implementations, the query data generated by the first party system can characterize the natural language content of the query input by the user 108. Alternatively, or additionally, the query data generated by the first party system can characterize a context in which the user 108 provided the query to the application 116. Alternatively, or additionally, the user 108 can authenticate themselves with the first party system and/or the computing device 102, and the query data generated by the first party system can include authentication data that securely identifies the user 108.

In some implementations, third party entities can undertake one or more processes in order to register with the first party system and securely receive query data from the first party system via the application 116, which can be provided by the entity that controls the first party system or a different entity. For example, one or more third party entities that are registered with a first party entity that provides the first party system can be providers of one or more third party applications. Registering with the first party entity allows the third party entities to receive query data and, in response, provide entity-specific GUI data for allowing the first party system to render a corresponding subsidiary third party application at the application 116. In some implementations, the subsidiary third party applications can be rendered with other search results from the internet, thereby allowing the user 108 the option to interact with various available applications and/or browse the internet for further information.

Figure 1B:
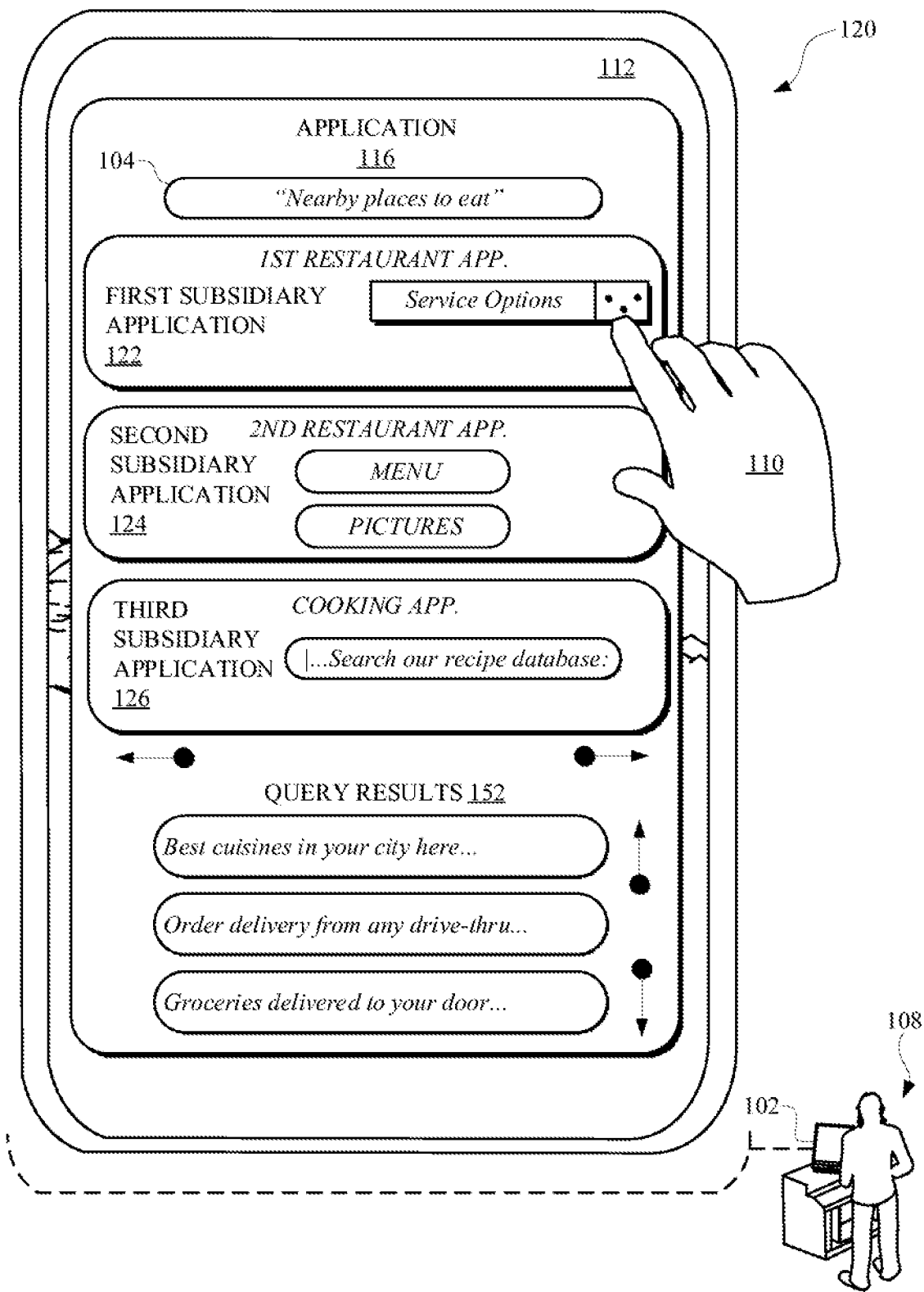
Figure 1C:
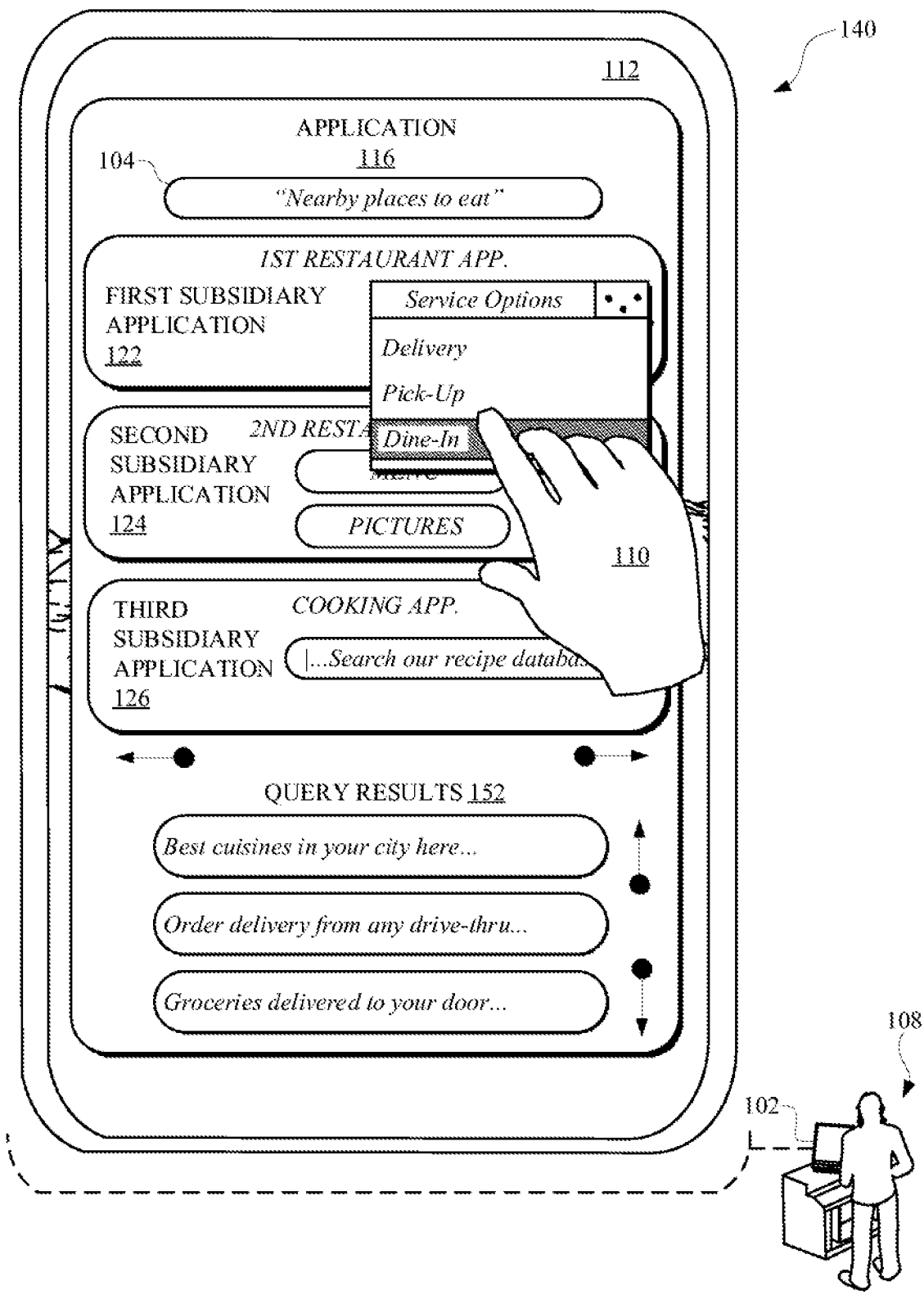

FIG. 1B illustrates a view 120 of the first party system causing the application 116 to render multiple different subsidiary third party applications and other query results 152. The first party system can cause rendering of the subsidiary third party applications after receiving entity-specific GUI data from various third party entities. Each instance of entity-specific GUI data can be ranked according to a determined relevance of an instance of entity-specific GUI data to the query input by the user 108. For example, as depicted in view 120, the first party system can prioritize entity-specific GUI data corresponding to a first subsidiary application 122 over other entity-specific GUI data corresponding to a second subsidiary application 124 and/or a third subsidiary application 126. As a result, the first subsidiary application 122 can be prioritized over the second subsidiary application 124 during rendering of subsidiary third party applications.

In some implementations, entity-specific GUI data received from the third party entities can characterize interactive content and/or natural language content that embodies a respective subsidiary third party application. As an example, entity-specific GUI data for the first subsidiary application 122 can identify at least two interactive elements and their respective control functions (e.g., "/First-Entity/Service Options('Delivery,' 'Pick-Up,' 'Dine-In')). Furthermore, entity-specific GUI data for the second subsidiary application 124 can include other interactive elements 128 and their respective control functions (e.g., "/Second-Entity/Menu( )) & /Second-Entity/Pictures( ))". The first party system can prioritize the first subsidiary application 122 over the second subsidiary application 124 based on a comparison between content of the received entity-specific GUI data. For example, because the entity-specific GUI data for the first entity characterizes more properties of food services than the entity-specific GUI data for the second entity, the subsidiary third party application for the first entity (i.e., the first subsidiary application 122) can be prioritized over the subsidiary third party application for the second entity (i.e., second subsidiary application 124).

In order for the user 108 to be able to control certain features of the subsidiary third party applications, responsive data from the third party entities can include the same or different authentication data that was included in the query data provided by the first party system 116. The first party system 116 can monitor for inputs to each subsidiary third party application and convert the inputs to control commands for initializing certain services provided by corresponding third party entities (e.g., selection of a "Service Options" drop-down menu 128). In this way, despite the computing device 102 not having previously installed an application from the first entity and/or an application from the second entity, benefits offered by those entities can be realized. For example, if a particular entity offers a GUI interface that is optimized for their particular search query, at least compared to other GUI interfaces offered by other entities, the GUI interface can be accessed with reduced latency compared to downloading and installing a corresponding application.

In some implementations, in response to the user 108 interacting with the first subsidiary application 122 via the touch interface 112, the third party subsidiary application that is executing at the computing device 102 can transmit data back to the first entity. For example, as provided in view 140 of FIG. 1C, modified query data can be transmitted back to the first entity, and/or any other entity with prior permission from the user 108 in response to a selection from the user 108. For instance, in response to the user 108 selecting a GUI element 142 at the first subsidiary application 122, the first party system can generate modified query data and transmit the modified query data to the first entity. The modified query data can include, for example, content such as "/First-Entity/Service Options ('Dine-In')," in order to characterize the interaction between the user 108 and the first subsidiary application 122. In response to receiving the modified query data, the first entity, a server managed by the first entity, and/or an application managed by the first entity, can generate a command to be transmitted to one or more servers, the computing device 102, an automated assistant associated with the user 108, the first party system, the application 116, and/or any other apparatus or module capable of interacting with a function or application that the user 108 is intending to control.

In some implementations, the query results 152 generated by the first party system can be a link to a webpage that is also controlled by a third party entity that provides a subsidiary application being rendered at the application 116. Additionally, or alternatively, interface elements that are included in the webpage can also be the same or similar to those included in the subsidiary third party application being rendered at the application 116. Additionally, or alternatively, interface elements included in the webpage can include additional interface elements that are not included in the subsidiary third party application and/or a third party application that is provided by the third party entity. The additional interface elements included in the webpage, but not in a corresponding subsidiary third party application, can be used to initialize performance of tasks that are different from tasks capable of being performed via interaction with a corresponding subsidiary third party application.

In some implementations, the query results 152 can include one or more links (e.g., deep links) that, when selected, causes a third party application to operate according to a particular state. This particular state can be the same or similar to a state that can be achieved by interacting with a corresponding subsidiary third party application. Additionally, or alternatively, this particular state can be different from a state that can be achieved by interacting with the corresponding subsidiary third party application. For example, in some implementations, when the first subsidiary application 122 includes the "Service Options" interactive element, the first party system can cause the query results 152 to include one or more links that, when selected, cause a corresponding third party application to enter a respective state. In some implementations, the respective state can correspond to the third party application rendering various interactive elements that include, or do not include, one or more interactive elements being rendered at the first subsidiary application 122. For example, the query result 152 "Order delivery from any drive-thru" can be provided by a third party entity that also provided the entity-specific GUI data for rendering the first subsidiary application 122. The query result 152 "Order delivery from any drive-thru" can be a selectable link that, when selected, causes the application 116 and/or a third party application to enter a particular state in which the certain fields have been auto-filled based on parameters identified in a deep link that corresponds to that query result. For instance, the third party application interface for the state can include a "Service" drop-down menu in which "Delivery" is auto-selected, and a "Restaurant Type" drop-down menu in which "Drive-Thru" is auto-selected. The user 108 can then interact with the application 116 and/or the third party application in order to further their order without being required to manually and individually complete all fields and/or navigate through various states of the application 116 and/or third party application.

In some implementations, the third party entities can manage data that is received from the first party system when the user 108 is interacting with the third party subsidiary applications at an interface of the application 116. For example, the user 108 can schedule operations to be performed by one or more devices or applications using a subsidiary third party application. Data characterizing the scheduled operations can be subsequently accessed when the user 108 provides a subsequent request to the first party system for controlling the one or more services. Should a subsidiary third party application corresponding to the third party entity store schedule data, the user 108 can interact with the subsidiary third party application in order to modify a previously stored schedule. Modifications and/or other data characterizing the schedule can also be embodied in the query data transmitted between the first party system and one or more third party entities.

Figure 1D:
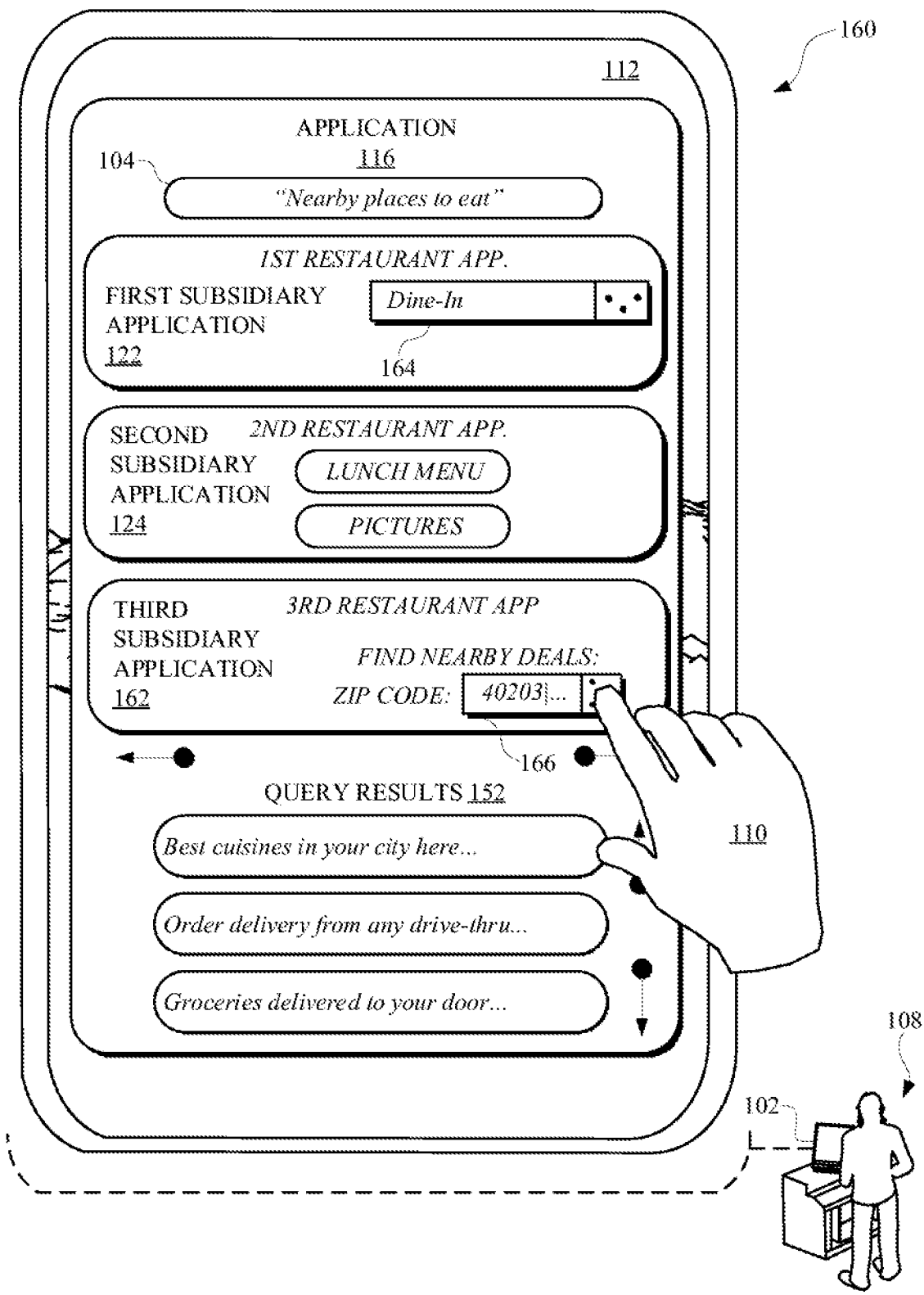

FIG. 1D illustrates a view 160 of the first party system causing rendering of various subsidiary third party applications with content that has been pre-selected based on previous interactions between the user 108, the first party system, the application 116, and/or one or more subsidiary third party applications. Specifically, the first party system and/or a subsidiary third party application can determine that the user 108 has previously provided similar search strings (e.g., "lunch restaurants nearby," "happy hour deals nearby") relative to the search provided into the text field 104 at FIG. 1D. The first party system and/or each subsidiary third party application can then determine whether the user 108 previously interacted with certain rendered content subsequent to providing the previous similar search strings.

For example, the first subsidiary application 122, and/or third party entity corresponding to the first subsidiary application 122, can determine that the user 108 has previously interacted with the first subsidiary application 122 to select "Dine-In" as an option from a drop-down menu 164. As a result, the third party entity can generate entity-specific GUI data for the first party system in response to the most recent search query (e.g., "Nearby places to eat"), and the entity-specific GUI data can identify the "Dine-In" entry as being pre-selected from the drop-down menu 164.

In some implementations, a third party entity can correlate secured data, received in response to the user 108 providing a search query, to existing data that a third party entity may have obtained from the user 108 and/or other source. For example, the user 108 may already have an account with a third party entity that corresponds to the third subsidiary application 162, and the account may identify data (e.g., a zip code) that the user 108 prefers. Therefore, in response to receiving the query data, the third party entity can generate entity-specific GUI data that is based on the search query from the user 108 (e.g., "Nearby places to eat") and existing data managed by the corresponding third party entity. The entity-specific GUI data can identify an interactive GUI element 166 and characterize pre-selected content (e.g., "ZIP CODE: 40203") to be incorporated into the interactive GUI element 166. Additionally, or alternatively, the third party entities can access contextual data in order to incorporate pre-selected content into entity-specific GUI data provided to the first party system. For instance, a second third party entity can use a time of day, location, and/or any other feature of a context in which the user 108 submits a search query in order to identify pre-selected content (e.g., a link to a "Lunch Menu" in the second subsidiary application 124) over other content that may be available via a fully installed version of the second subsidiary application 124. In other words, contextual data and/or historical interaction data can be used to pre-select certain content to be rendered at a subsidiary third party application, in order to preserve computational resources, such as memory and network bandwidth, that might otherwise be consumed by providing context-agnostic content to the first party system and/or the application 116.

Figure 1E:
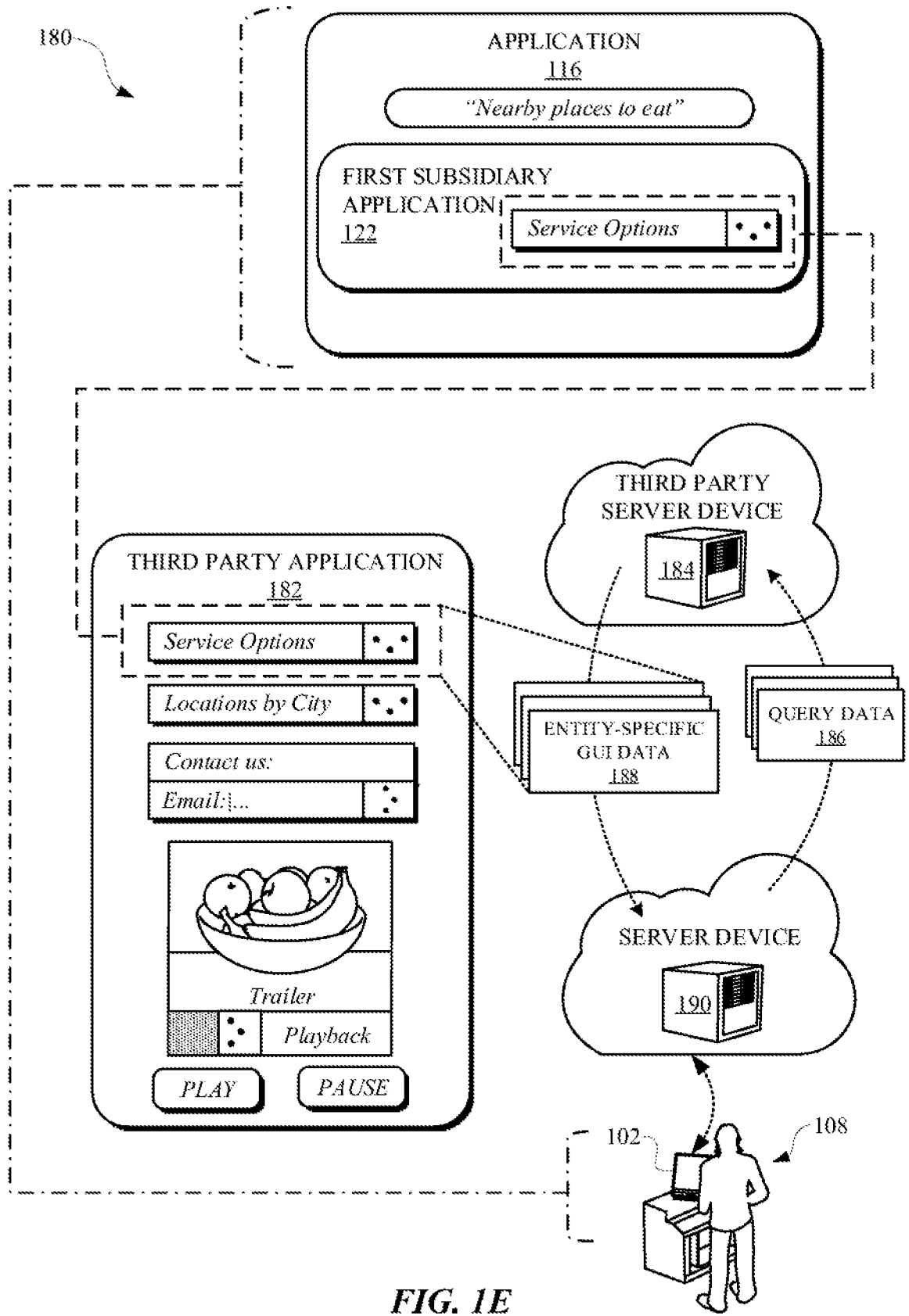

As an example, FIG. 1E illustrates a view 180 of the user 108 providing the search query to the application 116 and, in response, a third party entity (e.g., a third party server device 184) receiving query data 186 from the first party system. Furthermore, the third party entity can use the query data 186 in order to generate entity-specific GUI data 188, which can characterize one or more portions of a third party application 182 available from the third party entity. In other words, a third party entity can offer a third party application 182, which can be downloaded and installed by the user 108 to the computing device 102. However, in order for the third party entity to provide services similar to the third party application 182, without necessitating downloading of the entire application, the third party entity can register with a first party entity that provides the first party system (e.g., in some implementations, the first party system can be, or include, the application 116). In this way, the third party server device 184 will be registered to receive query data 186 from a server device 190 and/or computing device 102 associated with the first party entity. As a result, the third party entity will be able to decide how first subsidiary applications 122 will be rendered for a user 108 in response to a particular search query. For example, instead of the entire third party application 182 being rendered at the computing device 120, only one or more particular GUI elements (e.g., a drop-down menu for "Service Options") can be rendered at the first subsidiary application 122 that is rendered in response to the search query (e.g., "Nearby places to eat"). This can preserve computational resources at the computing device 102—which might otherwise be tasked with queuing a video (e.g., a "Trailer" for a restaurant) and other graphics at the computing device 102, if the user 108 had elected to download and open the third party application 182 at the computing device 102.

Figure 2A:
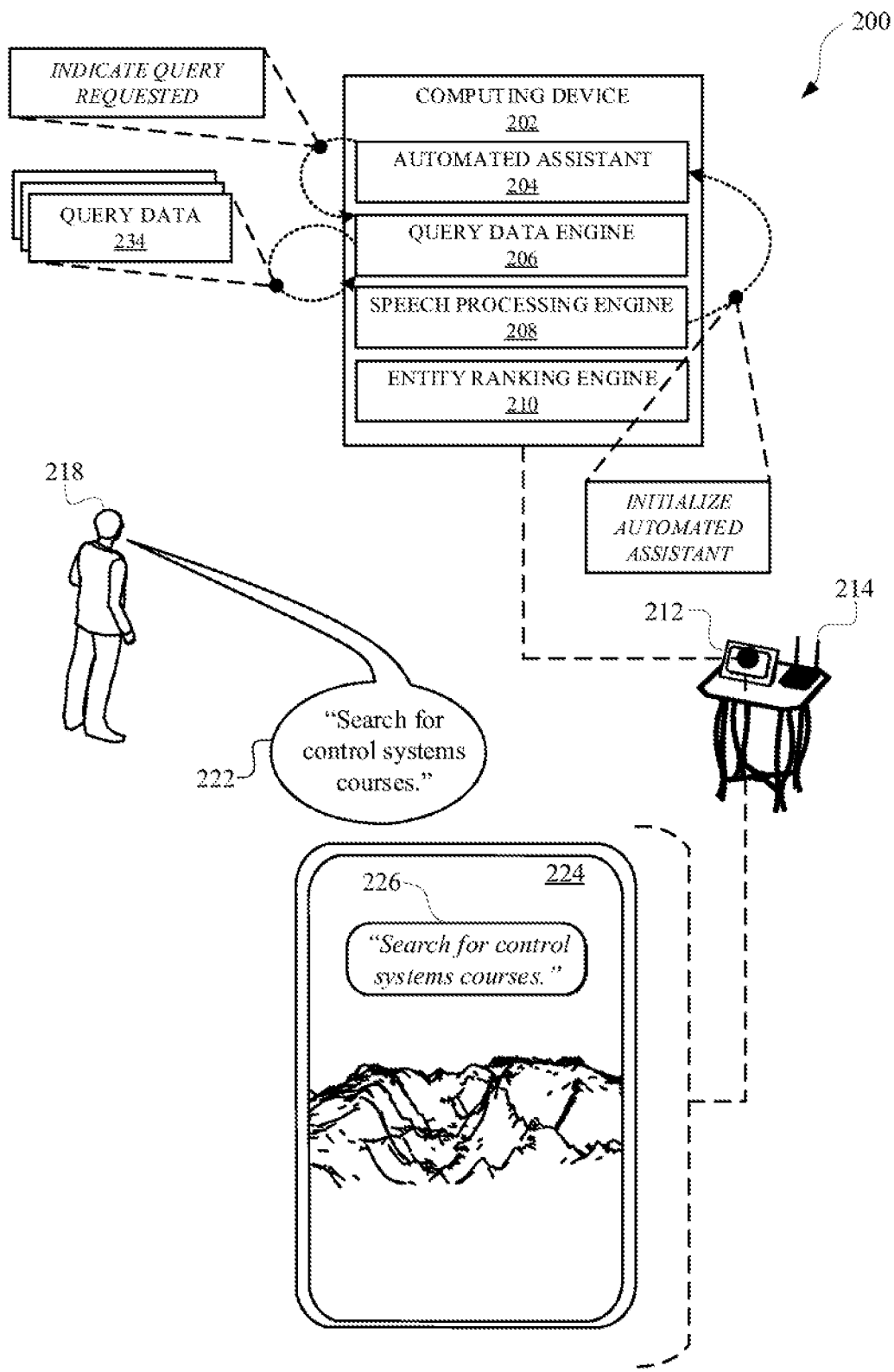
FIG. 2A, FIG. 2B, FIG. 2C, FIG. 2D, and FIG. 2E illustrate views of a user submitting a query and, in response, being provided access to multiple different subsidiary third party applications.

FIG. 2A, FIG. 2B, FIG. 2C, FIG. 2D, and FIG. 2E illustrate a view 200, a view 220, a view 240, a view 260, and a view 280, respectively, of a user 218 providing a search query to an application (e.g., a browser, automated assistant, and/or any other application) and, in response, being provided access to multiple different subsidiary third party applications. Each subsidiary third party application can provide functionality for controlling one or more functions of a corresponding third party application, which can otherwise provide a greater set of functions than what may be instantly available via a corresponding subsidiary third party application. For example, the user 218 can provide a spoken utterance 222 in furtherance of receiving recommendations for courses for learning how to develop a control system for controlling their home and/or a device within their home, such as a thermostat. In order to receive the recommendations, the user 218 can provide the spoken utterance 222, "Search for control system courses," as illustrated in FIG. 2A. The automated assistant 204 and/or another application (e.g., an internet search application) can determine that the user 218 has provided the spoken utterance 222 based on processing audio data at a speech processing engine 208 of the computing device 202. Based on the processing of the audio data at the speech processing engine 208, the speech processing engine 208 can initialize the automated assistant 204.

The automated assistant 204 can interpret the natural language content of the spoken utterance 222 and cause a query data engine 206 to identify one or more search queries requested by the user 218. The query data engine 206 can use information received from the automated assistant 204 and/or other application in order to generate query data 234 characterizing the one or more search queries provided by the user 218. The query data can then be transmitted to one or more servers and/or one or more devices associated with one or more third party entities that are capable of providing entity-specific data for generating subsidiary third party applications at an interface 224 of the computing device 202.

For example, the computing device 202 can be a standalone computing device 212 that is connected to a local area network 216 for controlling various IoT devices within a home of the user 218. The standalone computing device 212 can include a touch interface 224 for rendering a text field 226 for receiving input from the user and/or other interfaces through which the user can control various applications and/or devices.

In some implementations, query data 234 can be transmitted from a server device 238 to one or more third party server devices 232. Each third party server device 232 can process the query data 234 and generate entity-specific GUI data 236 that is to be processed at the server device 238 and/or the standalone computing device 212. In some implementations, entity-specific GUI data 236 can be prioritized according to a relevance of content of the entity-specific GUI data 236 to the spoken utterance 222 provided by the user 218.

Figure 2B:
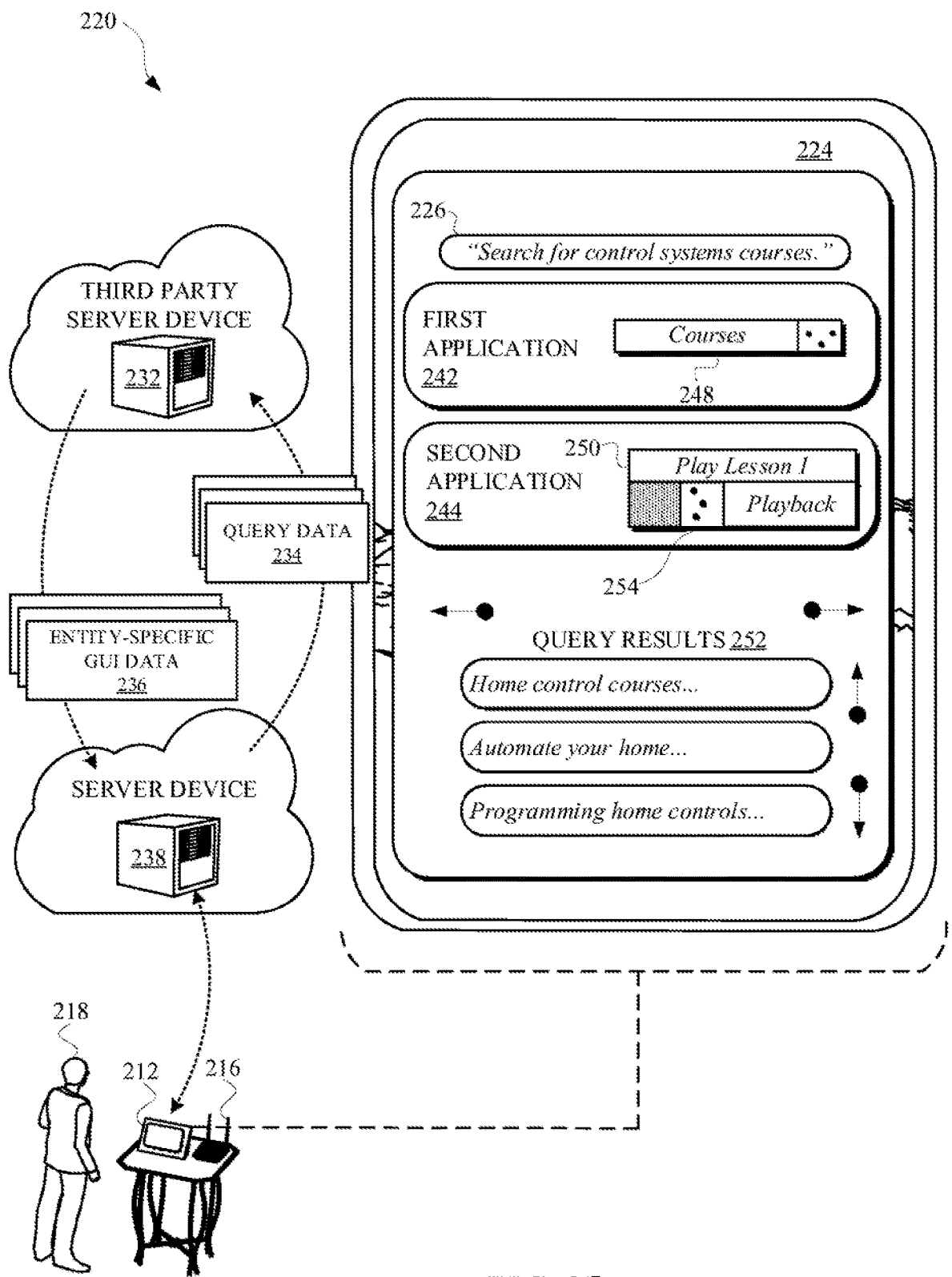

As an example, entity-specific GUI data corresponding to a first application 242 can be prioritized over other entity-specific GUI data corresponding to a second application 244, as illustrated in view 220 of FIG. 2B. This arrangement of subsidiary third party applications can be based on a priority assigned to each entity that provided entity-specific GUI data 236. In some implementations, subsidiary third party applications can be rendered simultaneous with query results 252, which can characterize various web results. The subsidiary third party applications rendered at the touch interface 224 can be scrolled through, in a carousel-like format (e.g., as indicated by direction arrows), separately from the query results 252. In other words, the subsidiary third party applications can be swiped left and right across the touch interface 224 to reveal other subsidiary third party applications, while the query results 252 can be swiped up and down across the touch interface 224. Furthermore, the user 218 can control one or more of the subsidiary third party applications simultaneously using touch inputs, spoken utterances, and/or any other input gestures capable of being received by a computing device. As an example, the user 218 can provide an input corresponding to a suggested spoken utterance from the second application 244 while simultaneously tapping on a query result of the query results 252 with their hand 228.

Referring to FIG. 2B, the entity-specific GUI data 236 can identify interactive content that is stored at the server device 238 and/or the standalone computing device 212. In this way, each subsidiary third party application can be rendered from available graphics, rather than requiring each third party to communicate graphics for a respective subsidiary third party application. For example, entity-specific GUI data 236 for the first application 242 can identify the interactive buttons 248, and the entity-specific GUI data 236 for the second application 244 can identify interactive buttons 250 and an interactive slider 254. As a result, the third party entities need not provide graphical data for rendering the interactive content, but, rather, can rely on targeting interactive content already available via the automated assistant and/or other application accessible via the standalone computing device 212.

Figure 2C:
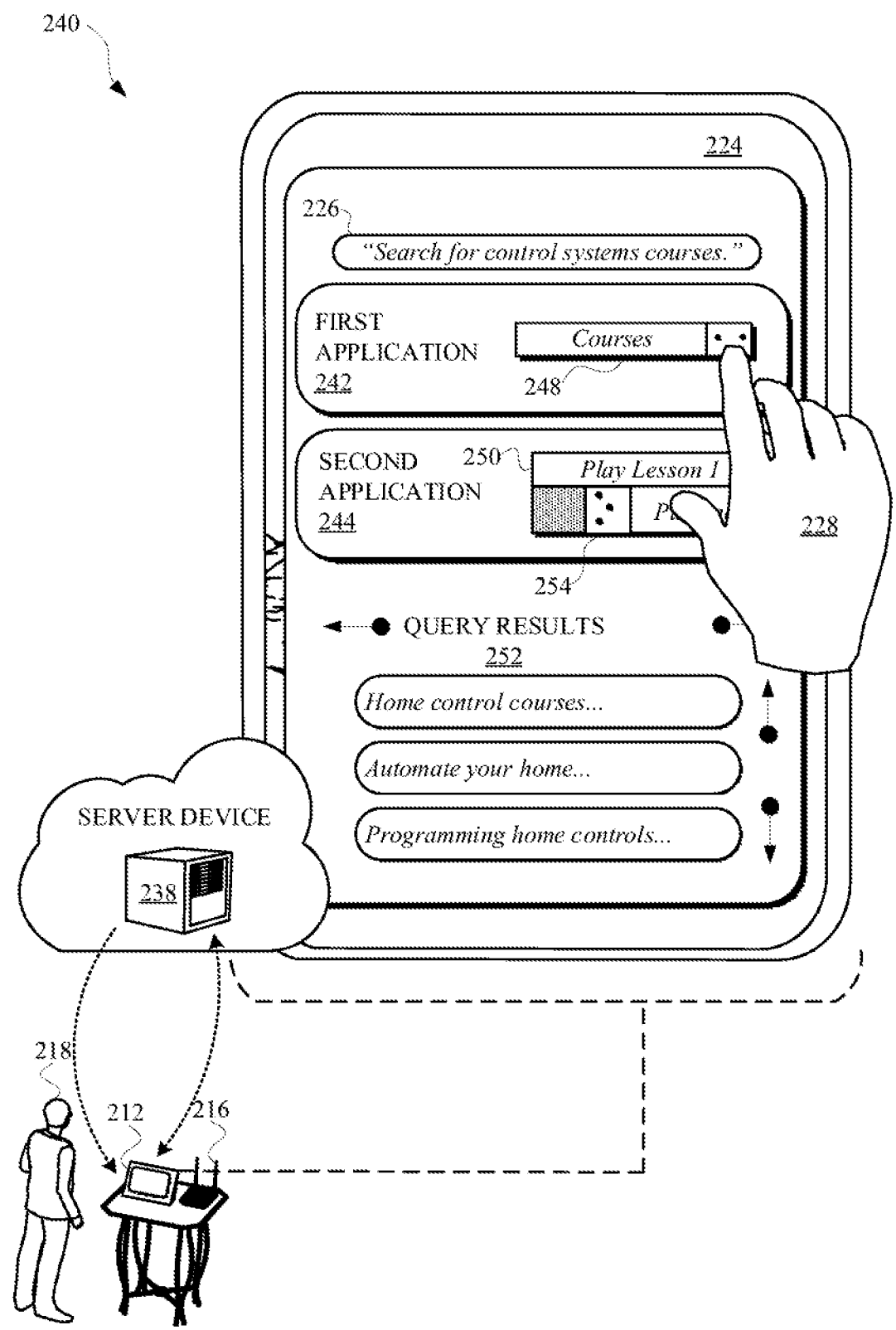

According to view 280 of FIG. 2C, the user 218 can select interactive content rendered at a subsidiary third party application in order to realize benefits of a service offered by an entity that provided the subsidiary third party application. For example, the user 218 can provide a touch input using their hand 228 in order to view courses offered by a first entity that provided the first application 242. Alternatively, the user 218 can provide a spoken utterance that embodies a query directed at the automated assistant and the first application 242. The spoken utterance can be received at an assistant interface of the standalone computing device 212. Audio data characterizing the spoken utterance can be processed at the standalone computing device 212 and/or communicated via a local area network 216 to a server device 238 for processing. The audio data and/or touch input can be processed in order to determine whether one or more input provided by the user 218 correspond to interactive content rendered at the touch interface 224.

Figure 2D:
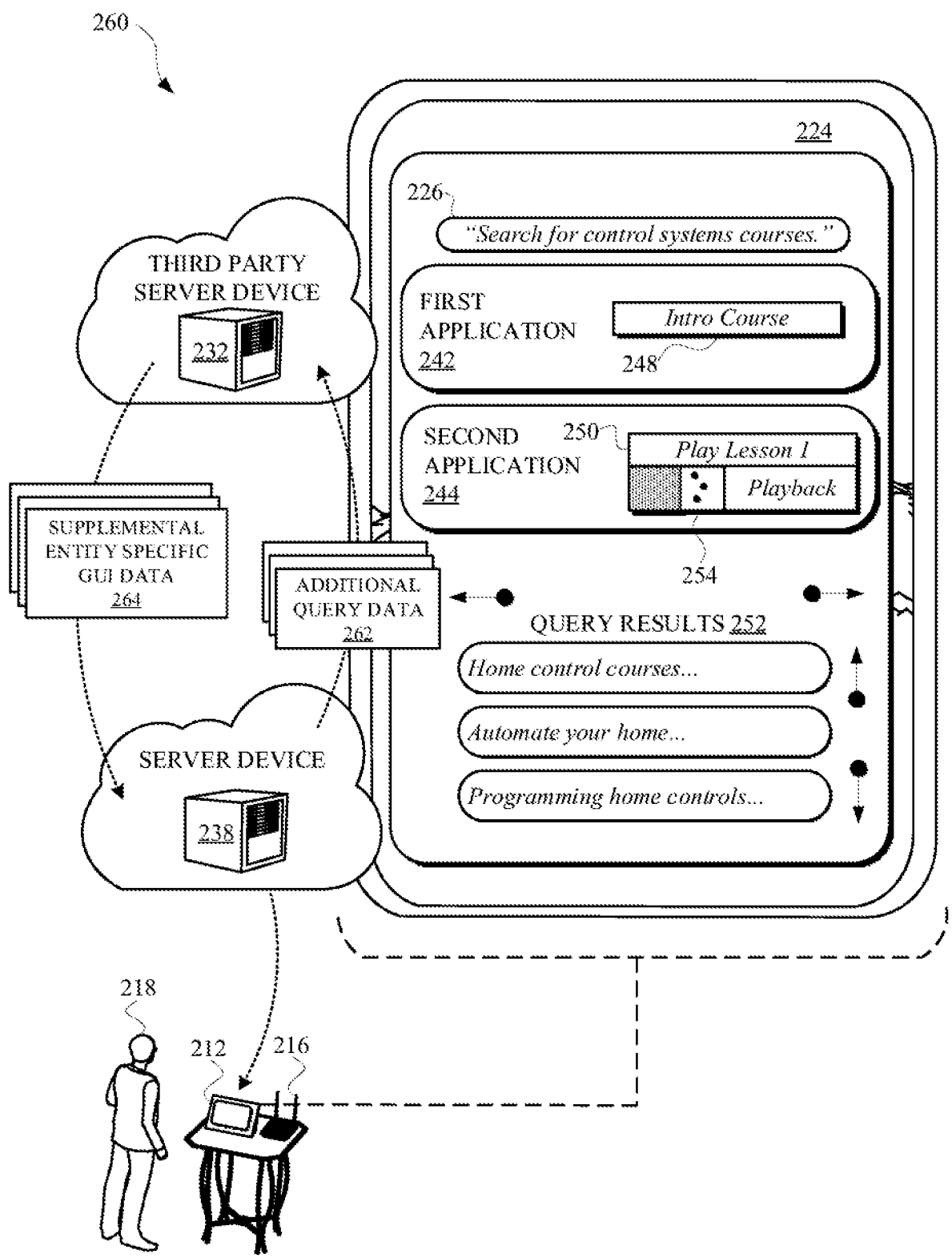
Figure 2E:
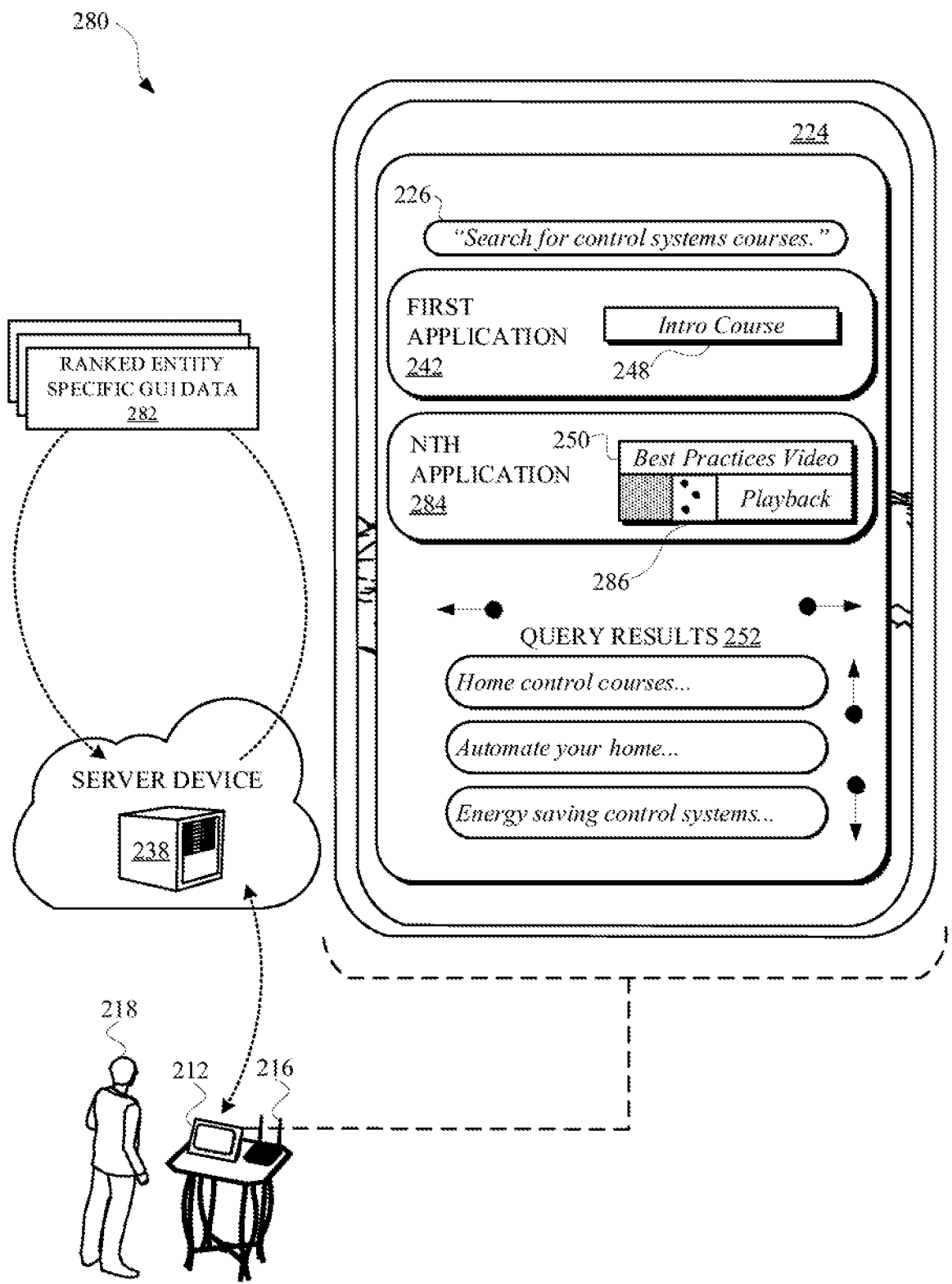

For instance, as illustrated in view 260 of FIG. 2D, the server device 238 and/or the standalone computing device 212 can provide additional query data 262 to one or more third party server devices 232. The additional query data 262 can be processed by each third party entity in order that each third party entity can provide supplemental entity-specific GUI data 264. The supplemental entity-specific GUI data 264 can be processed in order to determine a new ranking and/or priority for each subsidiary third party application rendered at the standalone computing device 212. For example, based on the user 218 interacting with the first application 242, each third party entity can generate different entity-specific GUI data that may be of more benefit compared to the entity-specific GUI data that was provided prior to the user 218 interacting with the first application 242. In this way, the subsidiary third party applications initially rendered for the user 218 to interact with can remain at, or be removed from, the touch interface 224 as the user 218 interacts with one or more subsidiary third party applications and/or query results 252.

Accordingly, as an example, because the user 218 has elected to interact with the first application 242 by providing a selection of an interactive button 248 for viewing available courses, each third party entity that received the additional query data 262 can provide supplemental entity-specific GUI data 264 that is more relevant to those available courses. For instance, as provided in view 280 of FIG. 2E, the server device 238 and/or the standalone computing device 212 can generate ranked entity-specific GUI data 282, which can be ranked and/or prioritized according to relevance of the supplemental entity-specific GUI data 264 to the touch input and/or any contextual data characterizing a context in which the user 218 provided the touch input. For instance, because the user 218 selected the courses offered by the first application 242 (e.g., "Intro Course"), supplemental entity-specific GUI data 282 can be ranked such that one or more Nth applications 284 that are associated with introductory programming courses can be rendered at the touch interface 224. For example, at least one Nth application 284 can include an adjustable element 286 for adjusting playback of a course video offered via the Nth application 284, as well as a suggestion element 250 that identifies the course video (e.g., "Best Practices Video"). In some implementations, the query results 252 can also be updated according to the ranked entity-specific a GUI data 282 and/or the spoken utterance 256. In this way, a dynamic presentation of subsidiary third party applications can be rendered at the touch interface 224. This can allow benefits (e.g., reducing latency resulting from switching between applications) to be realized without necessarily closing out of a current application (e.g., a browser) that the user is accessing.

Figure 3:
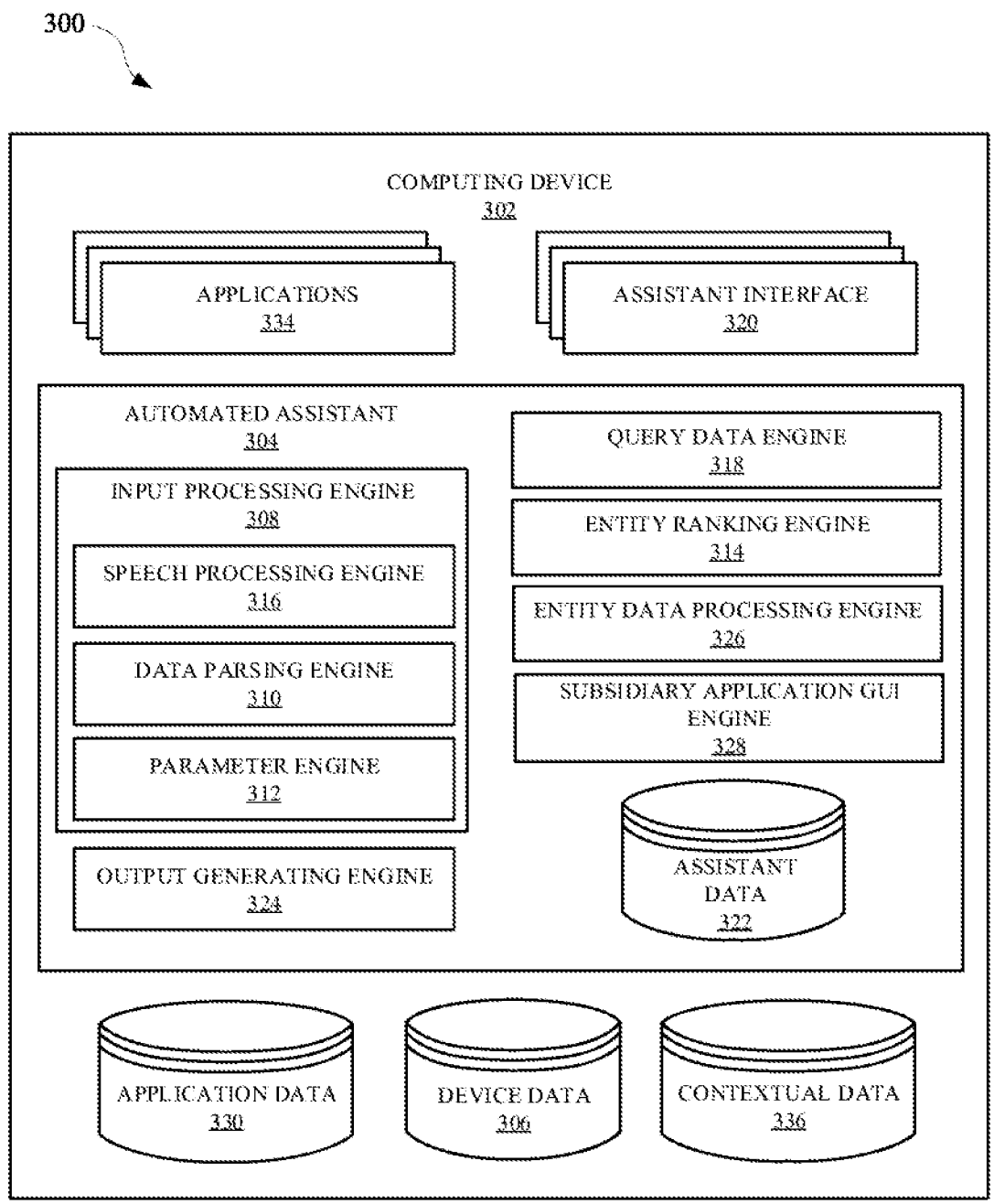
FIG. 3 illustrates a system for providing a subsidiary third party application GUI via a first party client interface and/or a first party system such as an automated assistant.

FIG. 3 illustrates a system 300 for providing a subsidiary third party application GUI via a first party client interface and/or a first party application such as an automated assistant 304. The automated assistant 304 can operate as part of an assistant application that is provided at one or more computing devices, such as a computing device 302 and/or a server device. A user can interact with the automated assistant 304 via an assistant interface 320, which can be a microphone, a camera, a touch screen display, a user interface, and/or any other apparatus capable of providing an interface between a user and an application. For instance, a user can initialize the automated assistant 304 by providing a verbal, textual, and/or a graphical input to an assistant interface 320 to cause the automated assistant 304 to perform a function (e.g., provide data, control a peripheral device, access an agent, generate an input and/or an output, etc.). The computing device 302 can include a display device, which can be a display panel that includes a touch interface for receiving touch inputs and/or gestures for allowing a user to control applications 334 of the computing device 302 via the touch interface. In some implementations, the computing device 302 can lack a display device, thereby providing an audible user interface output, without providing a graphical user interface output. Furthermore, the computing device 302 can provide a user interface, such as a microphone, for receiving spoken natural language inputs from a user. In some implementations, the computing device 302 can include a touch interface and can be void of a camera (or include a camera), but can optionally include one or more other sensors.

The computing device 302 and/or other third party client devices can be in communication with a server device over a network, such as the internet. Additionally, the computing device 302 and any other computing devices can be in communication with each other over a local area network (LAN), such as a Wi-Fi network. The computing device 302 can offload computational tasks to the server device in order to conserve computational resources at the computing device 302. For instance, the server device can host the automated assistant 304, and/or computing device 302 can transmit inputs received at one or more assistant interfaces 320 to the server device. However, in some implementations, the automated assistant 304 can be hosted at the computing device 302, and various processes that can be associated with automated assistant operations can be performed at the computing device 302.

In various implementations, all or less than all aspects of the automated assistant 304 can be implemented on the computing device 302 and can control one or more applications 334 (e.g., web browser(s)) of the computing device 302. In some of those implementations, aspects of the automated assistant 304 are implemented via the computing device 302 and can interface with a server device, which can implement other aspects of the automated assistant 304. The server device can optionally serve a plurality of users and their associated assistant applications via multiple threads. In implementations where all or less than all aspects of the automated assistant 304 are implemented via computing device 302, the automated assistant 304 can be an application that is separate from an operating system of the computing device 302 (e.g., installed "on top" of the operating system)—or can alternatively be implemented directly by the operating system of the computing device 302 (e.g., considered an application of, but integral with, the operating system).

In some implementations, the automated assistant 304 can include an input processing engine 308, which can employ multiple different modules and/or engines for processing inputs and/or outputs for the computing device 302 and/or a server device. For instance, the input processing engine 308 can include a speech processing engine 316, which can process audio data received at an assistant interface 320 to identify the text embodied in the audio data. The audio data can be transmitted from, for example, the computing device 302 to the server device in order to preserve computational resources at the computing device 302. Additionally, or alternatively, the audio data can be processed at the computing device 302.

The process for converting the audio data to text can include a speech recognition algorithm, which can employ neural networks, and/or statistical models for identifying groups of audio data corresponding to words or phrases. The text converted from the audio data can be parsed by a data parsing engine 310 and made available to the automated assistant 304 as textual data that can be used to generate and/or identify command phrase(s), intent(s), action(s), slot value(s), and/or any other content specified by the user. In some implementations, output data provided by the data parsing engine 310 can be provided to a parameter engine 312 to determine whether the user provided an input that corresponds to a particular intent, action, and/or routine capable of being performed by the automated assistant 304 and/or an application or agent that is capable of being accessed via the automated assistant 304. For example, assistant data 322 can be stored at the server device and/or the computing device 302, and can include data that defines one or more actions capable of being performed via the automated assistant 304, as well as parameters necessary to perform the actions. The assistant data 322 generated via the input processing engine 308 can be processed by an output generating engine 324, in order to cause the automated assistant 304 to provide an output to the user via an assistant interface 320, and/or initialize one or more actions (e.g., a search query) associated with one or more applications 334 (e.g., a web browser and/or web page).

In some implementations, the computing device 302 can include one or more applications 334, which can be provided by a third party entity that is different from an entity that provided the computing device 302 and/or the automated assistant 304. An output generating engine 324 of the automated assistant 304 and/or the computing device 302 can access application data 330 to determine one or more actions capable of being performed by one or more applications 334. Furthermore, the application data 330 and/or any other data (e.g., device data 306) can be accessed by the automated assistant 304 to generate contextual data 336, which can characterize a context in which a particular application 334 is executing at the computing device 302, and/or a context in which a particular user is accessing the automated assistant 304 and/or the computing device 302.

While one or more applications 334 are executing at the computing device 302, the device data 306 can characterize a current operating status of each application 334 executing at the computing device 302. Furthermore, the application data 330 can characterize one or more features of an executing application 334 (e.g., a subsidiary third party application(s)), such as content of one or more graphical user interfaces being rendered at the direction of one or more applications 334 (e.g., see FIGS. 2A-2E). In some implementations, the automated assistant 304 can initialize performance of one or more actions of an application 334.

In some implementations, a user can provide an input to an application 334 and/or the automated assistant 304 in furtherance of receiving information related to the input. For example, the user can provide a spoken utterance or textual input such as, "Book a trip to Thailand." In response, the automated assistant 304 can generate search query data at a query data engine 318. The search query data can include data that is similarly formatted for being received by a variety of different third party entities. For example, the data can be formatted as a URL, and content of the URL can characterize at least a portion of the natural language content of the spoken utterance. Alternatively, or additionally, the URL content can characterize contextual data associated with the spoken utterance, such as other natural language content that is being rendered at an interface of the computing device 302 or another device.

The query data can be transmitted from the computing device 302 to one or more devices and/or one or more other applications (e.g., a search page, website, web browser, etc.) controlled by one or more respective third party entities. Each respective third party entity can receive the query data and generate, in response, entity-specific data that characterizes content to be presented to the user. The entity-specific data can also be formatted as a URL or other format, and characterize the content that is to be rendered for the user. In some implementations, content of the URL can identify one or more interactive elements that the user can interact with in order to control a subsidiary third party application provided by a respective third party entity.

Entity-specific data can be received from multiple different third party entities at the computing device 302. The computing device 302 and/or the automated assistant 304 can use an entity ranking engine 314 in order to prioritize each instance of entity-specific data. Specifically, the entity ranking engine 314 can determine a relevance of each entity-specific data to content of the query provided by the user and/or contextual data 336 characterizing a context in which the user provided the query. Content of the entity-specific data received at the computing device 302 can be processed at an entity data processing engine 326, which can parse the entity-specific data into portions characterizing: interactive elements to be rendered at a particular subsidiary third party application, natural language content to be rendered at the particular subsidiary third party application, inputs and/or outputs to be generated in response to a user interacting with the interactive elements, and/or any other data that can be used when rendering an application at an interface of a computing device.

Entity-specific data that has been prioritized according to the entity ranking engine 314 can be provided to a subsidiary application GUI engine 328. A subsidiary application GUI engine 328 can cause the computing device 302 to render one or more subsidiary third party applications at an interface of the computing device 302, and optionally render a listing of query results also identified in response to the query from the user. In some implementations, in response to the user interacting with at least one subsidiary third party application, the computing device 302 can use the query data engine 318 in order to generate supplemental query data. The supplemental query data can include at least a portion of content previously provided by a corresponding third party entity and/or authentication data associated with the user. The computing device 302 can identify a third party entity associated with the supplemental query data and transmit the supplemental query data to a device, such as a server device, that is managed or otherwise controlled by the third party entity. Alternatively, or additionally, supplemental query data can be generated in response to the user interacting with the subsidiary third party application and the supplemental query data can characterize the interaction. The supplemental query data can then be provided to one or more different third party entities that did not provide the entity-specific data corresponding to the subsidiary third party application that the user interacted with.

In response to the user interacting with the subsidiary third party application, and one or more third party entities receiving the supplemental query data, the one or more third party entities can generate additional entity-specific data. The additional entity-specific data can be processed at the entity data processing engine 326, which can parse the received the data in order to determine how to arrange various interactive content at the interface (e.g., a display panel rendering a web browser or other application) of the computing device 302. In some implementations, processing of the received additional entity-specific data can result in different subsidiary third party applications being rendered at the interface of the computing device 302. In this way, the interface can fluidly change as the user interacts with various subsidiary third party applications.

Figure 4:
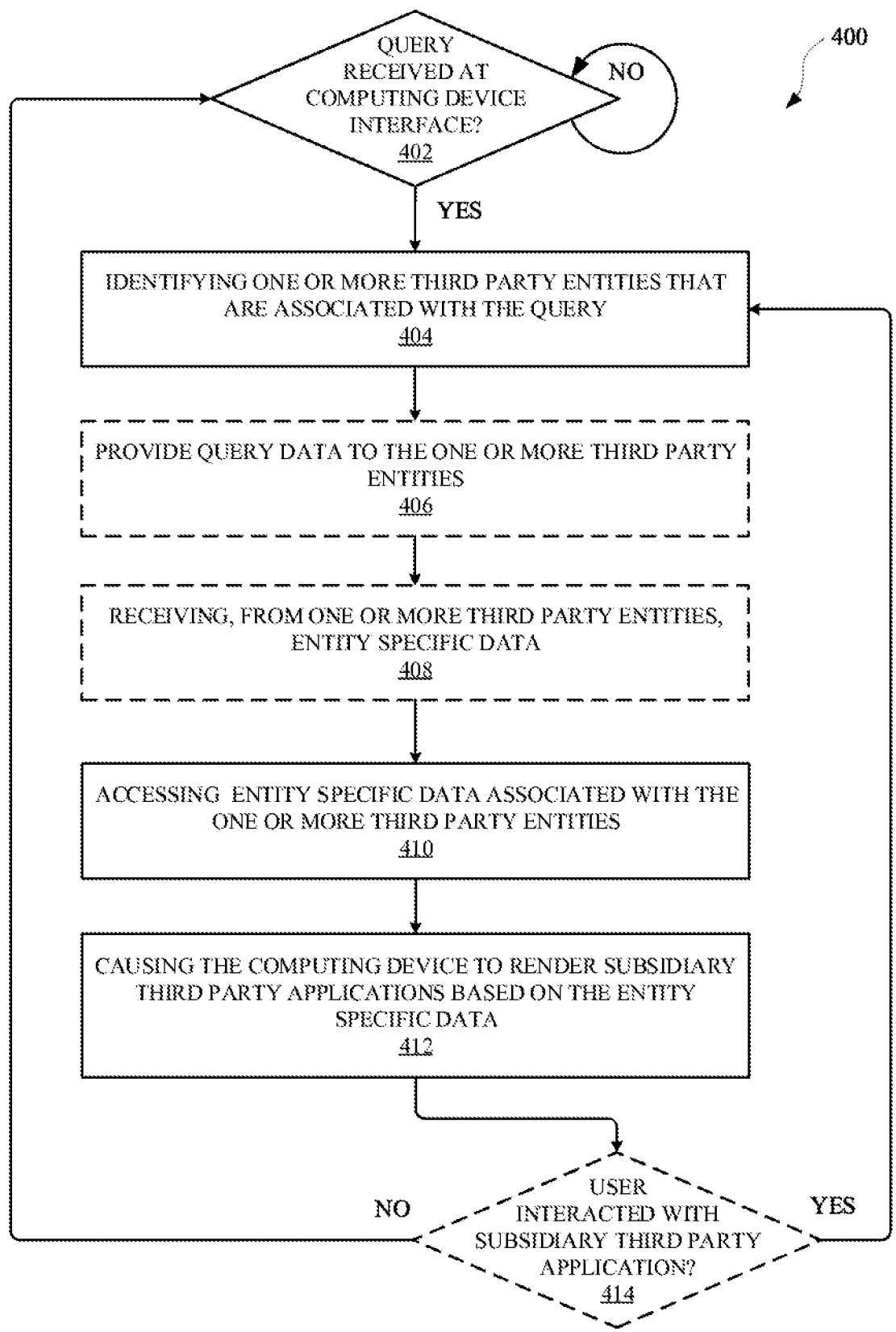
FIG. 4 illustrates a method for providing subsidiary third party applications via an interface that provides access to a first party system.

FIG. 4 illustrates a method 400 for providing various subsidiary third party applications at an interface that is accessible via a first party system in response to an input from a user. The method 400 can be performed by one or more computing devices, applications, and/or any other apparatus or module capable of interacting with third party entities in furtherance of rendering a third party application interface via a first party system. The method 400 can include an operation 402 of determining whether a search query was received at a computing device interface. The interface can be an audio interface, graphical interface, video interface, and/or any other interface that a user can interact with to provide an input to a computing device. The search query can be, for example, a spoken utterance such as, "Assistant, how can I arrange a trip to Greenland?" When a query is determined to be received at the computing device interface, the method 400 can proceed from the operation 402 to an operation 404. Otherwise, the computing device can continue to monitor one or more interfaces of the computing device in furtherance of the operation 402.

The operation 404 can include identifying one or more third party entities that are associated with the query. In some implementations, one or more third party entities can be registered with a first party entity that provides access to the first party system. Registering with the first party entity allows each third party entity to be notified, with prior permission from the user, when the user provides an input and/or query in furtherance of receiving information that is related to a particular service offered by each registered third party entity. Furthermore, registering with the first party entity allows each third party entity to receive query data in a format that is uniform for all third party entities that have registered with the first party entity. Thereafter, the third party entities can provide entity-specific data to the first party system in the same or similar format as the query data that was previously received.

The method 400 can further include an optional operation 406 providing query data to the one or more third party entities. In some implementations, the query data can be generated by include processing natural language content included in the query from the user and characterizing the natural language content in at least a portion of the query data. Additionally, or alternatively, generating the query data can include identifying contextual data associated with a circumstance in which the user provided the query. For example, the contextual data can characterize, with prior permission from the user, other information that is being rendered at the computing device, one or more prior inputs provided by the user to the computing device and/or the first party system, data generated from one or more sensors that are in communication with the computing device, and/or any other information that can be relevant to an input to a computing device. As an example, the user can be viewing a location on a map of Greenland via the internet and/or map application when the user provided the input, "Assistant, how can I arrange a trip to Greenland." As a result, the first party system can generate query data that includes at least a portion of data identifying the location the map that the user is viewing.

The method 400 can further include an optional operation 408 of receiving, from one or more of the third party entities, entity-specific data. The computing device and/or first party system can optionally receive the entity-specific data and prioritize instances of received entity-specific data according to a relevance of each instance of entity-specific data to: the query provided by the user and/or the contextual data characterizing a circumstance in which the user provided the query. As an example, the first party system can prioritize a first instance of entity-specific data that identifies the location on the map of Greenland that the user is viewing over a second instance of entity-specific data that does not identify the location on the map of Greenland. Additionally, or alternatively, the first party system can prioritize a first instance of entity-specific data that identifies the term "Greenland" as provided in content of the query over a second instance of entity-specific data that does not identify the term "Greenland." Additionally, or alternatively, the first party system can prioritize instances of entity-specific data according to whether one or more parameters of one or more actions capable of being performed by an application offered by a corresponding third party entity are relevant to the query from the user. For instance, the first party system can prioritize an instance of entity-specific data that identifies a date parameter or date field for a trip over other entity-specific data that does not identify a date parameter or field.

The method 400 can proceed from the optional operation 408 to an operation 410 of accessing the entity-specific GUI data. In some implementations, the entity-specific GUI data can be already available at the first party system when the query is received at the computing device interface. For example, third party entities can provide the entity-specific GUI data so that the entity-specific GUI data can be pre-loaded by the first party system, thereby reducing latency when rendering the subsidiary third party applications. Additionally, or alternatively, the entity-specific GUI data can be provided by the third party entities "on demand" and in response to receiving query data from the first party system.

The method 400 can proceed from the operation 410 to an operation 412 of causing the computing device to render subsidiary third party applications at an interface according to priorities that have been assigned to each instance of entity-specific data. In some implementations, each subsidiary third party application can control one or more actions and/or services offered by a corresponding third party entity. Furthermore, the interface can receive various different touch gestures, such as a two dimensional (2D) gesture, in order to allow the user to scroll between subsidiary third party applications. In this way, although the first party system may not be displaying a subsidiary third party application of interest to the user, the user can provide an input gesture that causes the subsidiary third party applications to be scrolled across the interface. As a result, other subsidiary third party applications that were not previously visible to the user can be rendered at the interface that provides access to the first party system, thereby allowing the user to control the other subsidiary third party applications that they have revealed by providing the gesture.

In some implementations, the method 400 can include an optional operation 414 of determining whether the user has interacted with a subsidiary third party application. When the user is determined to not have interacted with a subsidiary third party application after a particular period of time and/or after the subsidiary third party applications were rendered via the first party system, the method 400 can return to the operation 402. However, when the user is determined to have interacted with one or more subsidiary third party applications, the method 400 can proceed to the operation 404, wherein the first party system can identify one or more third party entities that may be relevant to the user interaction. For instance, the user can interface with a subsidiary third party application that allows the user to use interactive content, such as expandable menus and text input fields, in order to reserve a flight for Greenland.

In response, the first party system can generate additional query data. The additional query data can be transmitted to various third party entities that have been registered with the first party entity and, in response, the various third party entities can provide supplemental entity-specific data. In some implementations, a second set of third party entities that are providing the supplemental entity-specific data can be different from a first set of third party entities that previously provided the entity-specific data. The method 400 can then proceed from the operation 404 in furtherance of rendering the same or different subsidiary third party applications with the particular subsidiary third party application that the user already interacted with to reserve the flight.

Figure 5:
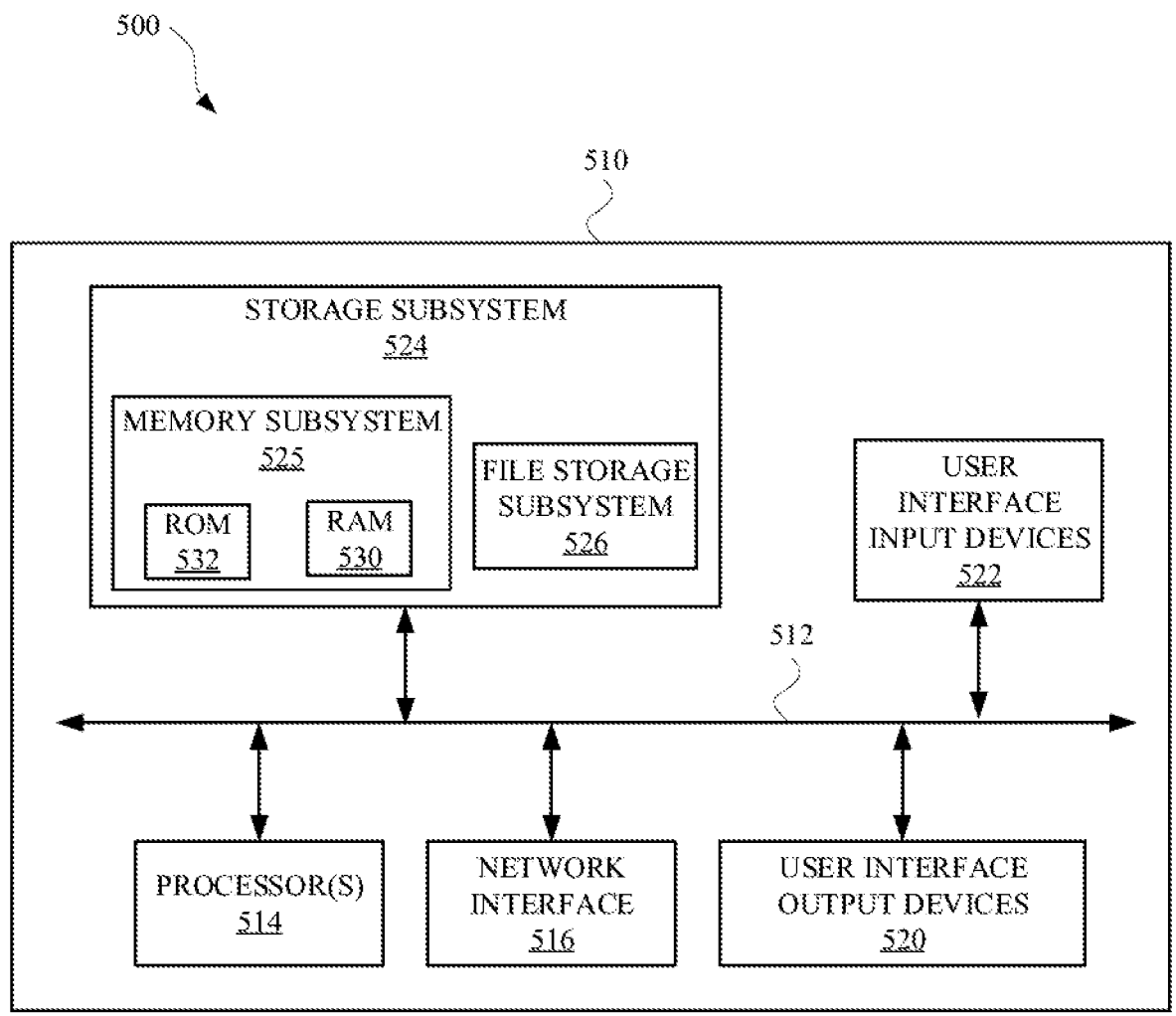
FIG. 5 is a block diagram of an example computer system.

FIG. 5 is a block diagram of an example computer system 510. Computer system 510 typically includes at least one processor 514 which communicates with a number of peripheral devices via bus subsystem 512. These peripheral devices may include a storage subsystem 524, including, for example, a memory 525 and a file storage subsystem 526, user interface output devices 520, user interface input devices 522, and a network interface subsystem 516. The input and output devices allow user interaction with computer system 510. Network interface subsystem 516 provides an interface to outside networks and is coupled to corresponding interface devices in other computer systems.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules described herein. For example, the storage subsystem 524 may include the logic to perform selected aspects of method 400, and/or to implement one or more of system 300, computing device 102, computing device 202, standalone computing device 212, server device 238, third party serve device(s) 232, and/or any other application, device, apparatus, and/or module discussed herein.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors is set forth as including operations such as causing, at a computing device, a first party system to render a set of subsidiary third party applications using entity-specific GUI data provided by third party entities, wherein each subsidiary third party application of the set of subsidiary third party applications includes an application interface with interactive content. The method can further include an operation of receiving, from a user via a device interface of the computing device, an input directed to a particular subsidiary third party application of the set of subsidiary third party applications. The method can further include an operation of generating, by the first party system, query data that characterizes the certain interactive content selected by the user. The method can further include an operation of providing, based on receiving the selection of the certain interactive content, the query data to the third party entities. The method can further include an operation of receiving, from an additional third party entity of the third party entities, additional entity-specific GUI data that characterizes other interactive content corresponding to an additional subsidiary third party application. The method can further include an operation of causing, based on receiving the additional entity-specific GUI data, the computing device to render the other interactive content corresponding to the additional subsidiary third party application, wherein the other interactive content is rendered separate from the certain interactive content corresponding to the particular subsidiary third party application.

In some implementations, the first party system includes an automated assistant or a browser application, and the first party system causes the set of subsidiary third party applications to be rendered in response to an input from the user to an interface of the computing device. In some implementations, the set of subsidiary third party applications are rendered according to a priority assigned to each subsidiary third party application of the set of subsidiary third party applications, and each priority is assigned according to a relevance of the each subsidiary third party application of the set of subsidiary third party applications to natural language content of the spoken utterance provided by the user.

In some implementations, each subsidiary third party application corresponds to a third party entity that provides a respective third party application that performs a greater number of actions when installed at the computing device relative to a corresponding subsidiary third party application provided by the third party entity. In some implementations, causing the computing device to render the other interactive content includes causing the computing device to no longer render the certain interactive content corresponding to the particular subsidiary third party application. In some implementations, causing the computing device to render the other interactive content includes causing a second set of subsidiary third party applications to be rendered according to a priority assigned to each subsidiary third party application of the second set of subsidiary third party applications. In some implementations, each priority is assigned according to a relevance of the each subsidiary third party application of the second set of subsidiary third party applications to the certain interactive content selected by the user. In some implementations, the particular subsidiary third party application is prioritized over any other subsidiary third party application identified in the second set of subsidiary third party applications at least based on the user selecting the certain interactive content.

In other implementations, a method implemented by one or more processors is set forth as including operations such as receiving, at a server device that facilitates access to a client application, a query that is based on a user input to an interface of the client application. The method can further include an operation of determining, based on receiving the query, that the query is associated with a plurality of third party entities, wherein each third party entity of the plurality of third party entities corresponds to a third party application that is provided by each third party entity. The method can further include an operation of identifying, based on the plurality of third party entities, entity-specific graphical user interface (GUI) data that characterizes interactive content to be rendered at the interface of the client application, wherein the interactive content includes, for each entity of the plurality of third party entities, at least one selectable GUI element that controls an action capable of being performed by a corresponding third party application. The method can further include an operation of causing, based on receiving the entity-specific GUI data, the client application to render the interactive content at the interface of the client application.

In some implementations, the method can further include an operation of generating query data based on the user input and other natural language content rendered at the interface of the client application. In some implementations, the at least one selectable GUI element for a particular third party application includes a text input field and/or an expandable menu. In some implementations, the method can further include an operation of, while the client application is rendering the interactive content at the interface: determining that the user has selected a selectable GUI element for a particular third party application corresponding to a particular third party entity, and generating, based on determining that the user selected the selectable GUI element for the particular third party application, entity data that is directed to the particular third party entity.

In some implementations, causing the client application to render the interactive content at the interface of the client application includes: causing the client application to render multiple different selectable GUI elements at a portion of the interface, wherein each selectable GUI element of multiple different GUI elements are capable of being selected via one or more touch input gestures to the interface. In some implementations, each selectable GUI element of multiple different GUI elements is rendered at the client application according to a priority assigned to each third party entity of the plurality of third party entities, and each priority is assigned according to a relevance of each entity-specific GUI data to content of the query provided by the user.

In some implementations, the method can further include an operation of providing, to each third party entity of the plurality of third party entities, query data that characterizes the user input provided to the client application, and receiving, from the plurality of third party entities, the entity-specific GUI data, wherein each third party entity of the plurality of third party entities provides particular entity-specific GUI data based at least on the query data. In some implementations, identifying the entity-specific graphical user interface (GUI) data includes accessing data that was previously provided by the plurality of third party entities. In some implementations, the entity-specific GUI data is identified without transmitting query data, which characterizes the query, to any of the third party entities of the plurality of third party entities.

In yet other implementations, a method implemented by one or more processors is set forth as including operations such as receiving, at a third party computing device, query data that characterizes an input from a user to a first party system, wherein the query data is provided, from the first party system, to multiple different third party computing devices in furtherance of receiving GUI data for rendering a plurality of different subsidiary third party applications via the first party system. The method can further include an operation of determining, based on receiving the query data, that the query data is associated with one or more actions capable of being performed by an application that is provided by a third party entity. The method can further include an operation of generating, based on determining that the query data is associated with the one or more actions, entity-specific GUI data that identifies interactive content that, when rendered at an interface via the first party system, allows the user to control each action of the one or more actions. The method can further include an operation of providing, to the first party system, the entity-specific GUI data, wherein the first party system receives different entity-specific GUI data from the multiple different third party computing devices. The method can further include an operation of causing, based on the first party system receiving the entity-specific GUI data, rendering of a subsidiary third party application using the entity-specific GUI data, wherein the subsidiary third party application allows the user to control the one or more actions capable of being performed by the application that is provided by the third party entity.

In some implementations, generating the entity-specific GUI data includes identifying the one or more actions that include at least one parameter identified in natural language content of the input from the user. In some implementations, the query data is received when another subsidiary third party application is being rendered at the interface via the first party system, and the input characterized by the query data corresponds to a user selection of interactive content provided via the other subsidiary third party application. In some implementations, causing the subsidiary third party application to be rendered using the entity-specific GUI data includes causing the subsidiary third party application to be rendered simultaneous to rendering of the other subsidiary third party application. In some implementations, the query data identifies a value stored, via the first party system, in association with a GUI element that is being rendered at the other subsidiary third party application.

In some implementations, causing rendering of the subsidiary third party application using the entity-specific GUI data includes causing rendering of web results at the interface simultaneous to the rendering of the subsidiary third party application and the other subsidiary third party application. In some implementations, the interface is responsive to a two-dimensional touch gesture and the first party system causes the interface to render various different subsidiary third party applications in response to the interface receiving the two-dimensional touch gesture. In some implementations, the various different subsidiary third party applications are assigned a lower priority relative to a priority assigned to the subsidiary third party application and another subsidiary third party application.

We claim:

1. A method implemented by one or more processors, the method comprising:
 causing, at a computing device, a first party system to render a set of subsidiary third party applications using entity-specific GUI data provided by third party entities,
  wherein each subsidiary third party application of the set of subsidiary third party applications includes an application interface with certain interactive content;
 receiving, from a user via a device interface of the computing device, an input directed to a particular subsidiary third party application of the set of subsidiary third party applications;
 generating, by the first party system, query data that characterizes the certain interactive content selected by the user;
 providing, based on receiving a selection of the certain interactive content, the query data to the third party entities;
 receiving, from an additional third party entity of the third party entities, additional entity-specific GUI data that characterizes other interactive content corresponding to an additional subsidiary third party application; and
 causing, based on receiving the additional entity-specific GUI data, the computing device to render the other interactive content corresponding to the additional subsidiary third party application,
  wherein the other interactive content is rendered separate from the certain interactive content corresponding to the particular subsidiary third party application.

2. The method of claim 1,
 wherein the first party system includes an automated assistant or a browser application, and
 wherein the first party system causes the set of subsidiary third party applications to be rendered in response to a particular input from the user to an interface of the computing device.

3. The method of claim 2,
 wherein the set of subsidiary third party applications are rendered according to a priority assigned to each subsidiary third party application of the set of subsidiary third party applications, and
 wherein each priority is assigned according to a relevance of the each subsidiary third party application of the set of subsidiary third party applications to natural language content of a spoken utterance provided by the user.

4. The method of claim 1, wherein each subsidiary third party application corresponds to a third party entity that provides a respective third party application that performs a greater number of actions when installed at the computing device relative to a corresponding subsidiary third party application provided by the third party entity.

5. The method of claim 1, wherein causing the computing device to render the other interactive content includes causing the computing device to no longer render the certain interactive content corresponding to the particular subsidiary third party application.

6. The method of claim 1, wherein causing the computing device to render the other interactive content includes causing a second set of subsidiary third party applications to be rendered according to a priority assigned to each subsidiary third party application of the second set of subsidiary third party applications.

7. The method of claim 6, wherein each priority is assigned according to a relevance of the each subsidiary third party application of the second set of subsidiary third party applications to the certain interactive content selected by the user.

8. The method of claim 6, wherein the particular subsidiary third party application is prioritized over any other subsidiary third party application identified in the second set of subsidiary third party applications at least based on the user selecting the certain interactive content.

9. A method implemented by one or more processors, the method comprising:
 receiving, at a server device that facilitates access to a client application, a query that is based on a user input to an interface of the client application;
 determining, based on receiving the query, that the query is associated with a plurality of third party entities,
  wherein each third party entity of the plurality of third party entities corresponds to a third party application that is provided by each third party entity;
 identifying, based on the plurality of third party entities, entity-specific graphical user interface (GUI) data that characterizes interactive content to be rendered at the interface of the client application,
  wherein the interactive content includes, for each entity of the plurality of third party entities, at least one selectable GUI element that controls an action capable of being performed by a corresponding third party application; and
 causing, based on receiving the entity-specific GUI data, the client application to render the interactive content at the interface of the client application.

10. The method of claim 9, further comprising:
 generating query data based on the user input and other natural language content rendered at the interface of the client application.

11. The method of claim 9, wherein the at least one selectable GUI element for a particular third party application includes a text input field and/or an expandable menu.

12. The method of claim 9, further comprising:
 while the client application is rendering the interactive content at the interface:
  determining that the user has selected a selectable GUI element for a particular third party application corresponding to a particular third party entity, and
  generating, based on determining that the user selected the selectable GUI element for the particular third party application, entity data that is directed to the particular third party entity.

13. The method of claim 9, wherein causing the client application to render the interactive content at the interface of the client application includes:
 causing the client application to render multiple different selectable GUI elements at a portion of the interface,
  wherein each selectable GUI element of multiple different GUI elements are capable of being selected via one or more touch input gestures to the interface.

14. The method of claim 13,
 wherein each selectable GUI element of multiple different GUI elements is rendered at the client application according to a priority assigned to each third party entity of the plurality of third party entities, and wherein each priority is assigned according to a relevance of each entity-specific GUI data to content of the query provided by the user.

15. The method of claim 9, further comprising:

providing, to each third party entity of the plurality of third party entities, query data that characterizes the user input provided to the client application, and receiving, from the plurality of third party entities, the entity-specific GUI data, wherein each third party entity of the plurality of third party entities provides particular entity-specific GUI data based at least on the query data.

16. The method of claim 9, wherein identifying the entity-specific graphical user interface (GUI) data includes accessing data that was previously provided by the plurality of third party entities.

17. The method of claim 16, wherein the entity-specific GUI data is identified without transmitting query data, which characterizes the query, to any of the third party entities of the plurality of third party entities.

18. A method implemented by one or more processors, the method comprising:

receiving, at a third party computing device, query data that characterizes an input from a user to a first party system,
wherein the query data is provided, from the first party system, to multiple different third party computing devices in furtherance of receiving GUI data for rendering a plurality of different subsidiary third party applications via the first party system;

determining, based on receiving the query data, that the query data is associated with one or more actions capable of being performed by an application that is provided by a third party entity;

generating, based on determining that the query data is associated with the one or more actions, entity-specific GUI data that identifies interactive content that, when rendered at an interface via the first party system, allows the user to control each action of the one or more actions;

providing, to the first party system, the entity-specific GUI data,
wherein the first party system receives different entity-specific GUI data from the multiple different third party computing devices; and causing, based on the first party system receiving the entity-specific GUI data, rendering of a subsidiary third party application using the entity-specific GUI data,
wherein the subsidiary third party application allows the user to control the one or more actions capable of being performed by the application that is provided by the third party entity.

19. The method of claim 18, wherein generating the entity-specific GUI data includes identifying the one or more actions that include at least one parameter identified in natural language content of the input from the user.

20. The method of claim 18, wherein the query data is received when another subsidiary third party application is being rendered at the interface via the first party system, and the input characterized by the query data corresponds to a user selection of interactive content provided via the other subsidiary third party application.

* * * * *